United States Patent
Takahashi et al.

(10) Patent No.: US 7,343,616 B1
(45) Date of Patent: Mar. 11, 2008

(54) INFORMATION RETRIEVAL METHOD AND APPARATUS

(75) Inventors: Yasushi Takahashi, Chiba (JP); Yoshihito Fujiwara, Kanagawa (JP); Kimiyoshi Yoshida, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/078,853

(22) Filed: May 14, 1998

(51) Int. Cl.
    *H04N 7/10* (2006.01)
    *H04N 7/173* (2006.01)

(52) U.S. Cl. ............... 725/46; 725/9; 725/34; 725/35

(58) Field of Classification Search ............ 725/46, 725/35, 9, 34
    See application file for complete search history.

(56) References Cited

U.S. PATENT DOCUMENTS

| | | | | |
|---|---|---|---|---|
| 5,444,499 A | * | 8/1995 | Saitoh | ............... 725/139 |
| 5,673,430 A | * | 9/1997 | Story | ............... 725/116 |
| 5,758,257 A | * | 5/1998 | Herz et al. | ............... 725/116 |
| 5,798,785 A | * | 8/1998 | Hendrrcks et al. | ............... 725/46 |
| 5,801,747 A | * | 9/1998 | Bedard | ............... 725/46 |
| 6,298,482 B1 | * | 10/2001 | Seidman et al. | ............... 725/101 |

FOREIGN PATENT DOCUMENTS

| | | |
|---|---|---|
| JP | 04-114769 | 5/1992 |
| JP | 05-136263 | 5/1993 |
| JP | 6-137591 | 6/1994 |

\* cited by examiner

*Primary Examiner*—Reuben M. Brown
(74) *Attorney, Agent, or Firm*—Frommer Lawrence & Haug LLP; William S. Frommer

(57) ABSTRACT

Based on a user's own basic selection tastes, the priority order of the information is determined, so that an information retrieval method and the apparatus which can retrieve the information desired by the user easily among from a huge amount of programs can be realized.

6 Claims, 31 Drawing Sheets

| | AVERAGE | BREAKFAST | LUNCH | DINNER | RELAXATION ON WEEKDAYS | RELAXATION ON HOLIDAYS |
|---|---|---|---|---|---|---|
| | GENRE | | | | | |
| AGE | "AUDIENCE RATING DATA OF GENRE FOR EACH LIFE SCENE DIVIDED ACCORDING TO AGE AND SEX(%)" | | | | | |

| | AVERAGE | BREAKFAST | LUNCH | DINNER | RELAXATION ON WEEKDAYS | RELAXATION ON HOLIDAYS |
|---|---|---|---|---|---|---|
| | GENRE | | | | | |
| LIFE STAGE | "AUDIENCE RATING DATA OF GENRE FOR EACH LIFE SCENE DIVIDED ACCORDING TO LIFE STAGE(%)" | | | | | |

| | AVERAGE | BREAKFAST | LUNCH | DINNER | RELAXATION ON WEEKDAYS | RELAXATION ON HOLIDAYS |
|---|---|---|---|---|---|---|
| | GENRE | | | | | |
| FACTOR | "AUDIENCE RATING DATA OF GENRE FOR EACH LIFE SCENE DIVIDED ACCORDING TO FACTOR AXIS(%)" | | | | | |

| TEENS-MALE | | WATCH TV | NEWS | SPORTS | VARIETY | DRAMA | MOVIE | DOCUMENTARY | MUSIC | CULTURE | PROGRAM FOR CHILDREN |
|---|---|---|---|---|---|---|---|---|---|---|---|
| BREAKFAST | 100 | 53.8 | 51.6 | 2.2 | 0 | 0 | 0 | 0 | 0 | 0 | 0 |
| LUNCH | 100 | 17.6 | 3.3 | 0 | 9.9 | 3.3 | 0 | 0 | 0 | 0 | 1.1 |
| DINNER | 100 | 67.1 | 24.2 | 0 | 23.1 | 4.4 | 2.2 | 1.1 | 1.1 | 0 | 1.1 |
| RELAXATION ON WEEKDAYS | 100 | 33 | 1.1 | 0 | 15.4 | 7.7 | 2.2 | 0 | 1.1 | 0 | 5.5 |
| RELAXATION ON HOLIDAYS | 100 | 29.7 | 0 | 3.3 | 14.3 | 4.4 | 3.3 | 0 | 0 | 0 | 4.4 |

| TWENTIES-MALE | | WATCH TV | NEWS | SPORTS | VARIETY | DRAMA | MOVIE | DOCUMENTARY | MUSIC | CULTURE | PROGRAM FOR CHILDREN |
|---|---|---|---|---|---|---|---|---|---|---|---|
| BREAKFAST | 100 | 66.6 | 64.4 | 1.1 | 1.1 | 0 | 0 | 0 | 0 | 0 | 0 |
| LUNCH | 100 | 36.6 | 12.2 | 0 | 20 | 4.4 | 0 | 0 | 0 | 0 | 0 |
| DINNER | 100 | 73.3 | 30 | 2.2 | 30 | 8.9 | 1.1 | 1.1 | 0 | 0 | 0 |
| RELAXATION ON WEEKDAYS | 100 | 56.6 | 3.3 | 7.8 | 23.3 | 16.7 | 1.1 | 0 | 1.1 | 0 | 3.3 |
| RELAXATION ON HOLIDAYS | 100 | 35.5 | 2.2 | 5.6 | 16.7 | 1.1 | 4.4 | 1.1 | 1.1 | 1.1 | 2.2 |

| THIRTIES-MALE | | WATCH TV | NEWS | SPORTS | VARIETY | DRAMA | MOVIE | DOCUMENTARY | MUSIC | CULTURE | PROGRAM FOR CHILDREN |
|---|---|---|---|---|---|---|---|---|---|---|---|
| BREAKFAST | 100 | 59.7 | 58.7 | 0 | 0 | 0 | 0 | 0 | 0 | 0 | 1 |
| LUNCH | 100 | 37.5 | 25 | 0 | 9.6 | 2.9 | 0 | 0 | 0 | 0 | 0 |
| DINNER | 100 | 73.1 | 46.2 | 1.9 | 11.5 | 9.6 | 1 | 0 | 1 | 0 | 1.9 |
| RELAXATION ON WEEKDAYS | 100 | 59.7 | 18.3 | 9.6 | 18.3 | 7.7 | 2.9 | 1 | 0 | 0 | 1.9 |
| RELAXATION ON HOLIDAYS | 100 | 52 | 4.8 | 17.3 | 13.5 | 4.8 | 8.7 | 1.9 | 1 | 0 | 0 |

| FORTIES-MALE | | WATCH TV | NEWS | SPORTS | VARIETY | DRAMA | MOVIE | DOCUMENTARY | MUSIC | CULTURE | PROGRAM FOR CHILDREN |
|---|---|---|---|---|---|---|---|---|---|---|---|
| BREAKFAST | 100 | 54.3 | 53.5 | 0 | 0.8 | 0 | 0 | 0 | 0 | 0 | 0 |
| LUNCH | 100 | 38.6 | 21.3 | 0 | 15.7 | 1.6 | 0 | 0 | 0 | 0 | 0 |
| DINNER | 100 | 65.4 | 37 | 5.5 | 13.4 | 1.6 | 2.4 | 1.6 | 0 | 0 | 3.9 |
| RELAXATION ON WEEKDAYS | 100 | 63.8 | 22.8 | 8.7 | 10.2 | 3.9 | 15 | 2.4 | 0.8 | 0 | 0 |
| RELAXATION ON HOLIDAYS | 100 | 46.6 | 6.3 | 15 | 7.1 | 0.8 | 14.2 | 2.4 | 0 | 0 | 0.8 |

| FIFTIES-MALE | | WATCH TV | NEWS | SPORTS | VARIETY | DRAMA | MOVIE | DOCUMENTARY | MUSIC | CULTURE | PROGRAM FOR CHILDREN |
|---|---|---|---|---|---|---|---|---|---|---|---|
| BREAKFAST | 100 | 58.3 | 57.1 | 0 | 0 | 1.2 | 0 | 0 | 0 | 0 | 0 |
| LUNCH | 100 | 39.3 | 29.8 | 0 | 9.5 | 0 | 0 | 0 | 0 | 0 | 0 |
| DINNER | 100 | 66.7 | 60.7 | 0 | 2.4 | 2.4 | 0 | 0 | 0 | 0 | 1.2 |
| RELAXATION ON WEEKDAYS | 100 | 52.5 | 17.9 | 10.7 | 4.8 | 6 | 7.1 | 4.8 | 1.2 | 0 | 0 |
| RELAXATION ON HOLIDAYS | 100 | 46.5 | 8.3 | 15.5 | 4.8 | 2.4 | 10.7 | 2.4 | 2.4 | 0 | 0 |

| SIXTIES-MALE | | WATCH TV | NEWS | SPORTS | VARIETY | DRAMA | MOVIE | DOCUMENTARY | MUSIC | CULTURE | PROGRAM FOR CHILDREN |
|---|---|---|---|---|---|---|---|---|---|---|---|
| BREAKFAST | 100 | 58.4 | 51.2 | 0 | 0 | 6 | 0 | 1.2 | 0 | 0 | 0 |
| LUNCH | 100 | 51.2 | 33.3 | 0 | 6 | 8.3 | 1.2 | 1.2 | 0 | 1.2 | 0 |
| DINNER | 100 | 58.5 | 40.5 | 3.6 | 3.6 | 2.4 | 2.4 | 2.4 | 1.2 | 1.2 | 1.2 |
| RELAXATION ON WEEKDAYS | 100 | 33.4 | 9.5 | 4.8 | 3.6 | 4.8 | 8.3 | 2.4 | 0 | 0 | 0 |
| RELAXATION ON HOLIDAYS | 100 | 34.6 | 7.1 | 13.1 | 4.8 | 4.8 | 3.6 | 1.2 | 0 | 0 | 0 |

| TEENS-FEMALE | | WATCH TV | NEWS | SPORTS | VARIETY | DRAMA | MOVIE | DOCUMENTARY | MUSIC | CULTURE | PROGRAM FOR CHILDREN |
|---|---|---|---|---|---|---|---|---|---|---|---|
| BREAKFAST | 100 | 62.8 | 58.5 | 1.1 | 0 | 0 | 0 | 0 | 0 | 1.1 | 2.1 |
| LUNCH | 100 | 19.2 | 2.1 | 0 | 12.8 | 4.3 | 0 | 0 | 0 | 0 | 0 |
| DINNER | 100 | 62.7 | 19.1 | 0 | 26.6 | 9.6 | 0 | 0 | 0 | 0 | 7.4 |
| RELAXATION ON WEEKDAYS | 100 | 43.7 | 1.1 | 0 | 13.8 | 22.3 | 4.3 | 0 | 1.1 | 0 | 1.1 |
| RELAXATION ON HOLIDAYS | 100 | 33 | 0 | 0 | 17 | 6.4 | 4.3 | 0 | 3.2 | 0 | 2.1 |

| TWENTIES-FEMALE | | WATCH TV | NEWS | SPORTS | VARIETY | DRAMA | MOVIE | DOCUMENTARY | MUSIC | CULTURE | PROGRAM FOR CHILDREN |
|---|---|---|---|---|---|---|---|---|---|---|---|
| BREAKFAST | 100 | 59.1 | 52.4 | 0 | 0 | 1.9 | 0 | 0 | 0 | 0 | 4.8 |
| LUNCH | 100 | 50.5 | 7.6 | 0 | 36.2 | 5.7 | 0 | 0 | 0 | 1 | 0 |
| DINNER | 100 | 67.9 | 24.8 | 0 | 24.8 | 8.6 | 1 | 1 | 1 | 0 | 6.7 |
| RELAXATION ON WEEKDAYS | 100 | 52.4 | 7.6 | 1.9 | 15.2 | 21.9 | 4.8 | 0 | 0 | 0 | 1 |
| RELAXATION ON HOLIDAYS | 100 | 32.5 | 2.9 | 1.9 | 18.1 | 4.8 | 3.8 | 1 | 0 | 0 | 0 |

| THIRTIES-FEMALE | | WATCH TV | NEWS | SPORTS | VARIETY | DRAMA | MOVIE | DOCUMENTARY | MUSIC | CULTURE | PROGRAM FOR CHILDREN |
|---|---|---|---|---|---|---|---|---|---|---|---|
| BREAKFAST | 100 | 66.1 | 61.2 | 0 | 1 | 1 | 0 | 0 | 0 | 0 | 2.9 |
| LUNCH | 100 | 63.1 | 22.3 | 1 | 34 | 5.8 | 0 | 0 | 0 | 0 | 0 |
| DINNER | 100 | 64.1 | 29.1 | 0 | 14.6 | 6.8 | 0 | 0 | 0 | 0 | 13.6 |
| RELAXATION ON WEEKDAYS | 100 | 56.3 | 10.7 | 2.9 | 16.5 | 15.5 | 3.9 | 0 | 1 | 1.9 | 3.9 |
| RELAXATION ON HOLIDAYS | 100 | 44.8 | 3.9 | 3.9 | 15.5 | 11.7 | 6.8 | 1 | 1 | 0 | 1 |

| FORTIES-FEMALE | | WATCH TV | NEWS | SPORTS | VARIETY | DRAMA | MOVIE | DOCUMENTARY | MUSIC | CULTURE | PROGRAM FOR CHILDREN |
|---|---|---|---|---|---|---|---|---|---|---|---|
| BREAKFAST | 100 | 61.6 | 60.7 | 0 | 0 | 0.9 | 0 | 0 | 0 | 0 | 0 |
| LUNCH | 100 | 60.7 | 28 | 0 | 24.3 | 4.7 | 0.9 | 0 | 0 | 2.8 | 0 |
| DINNER | 100 | 61.6 | 33.6 | 0 | 19.6 | 5.6 | 0.9 | 0 | 0.9 | 0 | 1.9 |
| RELAXATION ON WEEKDAYS | 100 | 38.2 | 6.5 | 0.9 | 11.2 | 15.9 | 6.5 | 0 | 1.9 | 0.9 | 0 |
| RELAXATION ON HOLIDAYS | 100 | 36.5 | 2.8 | 1.9 | 15 | 7.5 | 6.5 | 0.9 | 1.9 | 0 | 0 |

| FIFTIES-FEMALE | WATCH TV | NEWS | SPORTS | VARIETY | DRAMA | MOVIE | DOCUMENTARY | MUSIC | CULTURE | PROGRAM FOR CHILDREN |
|---|---|---|---|---|---|---|---|---|---|---|
| BREAKFAST | 100 | 62 | 57 | 0 | 0 | 5 | 0 | 0 | 0 | 0 | 0 |
| LUNCH | 100 | 63 | 37 | 0 | 15 | 8 | 0 | 0 | 1 | 2 | 0 |
| DINNER | 100 | 63 | 49 | 1 | 7 | 5 | 0 | 0 | 1 | 0 | 0 |
| RELAXATION ON WEEKDAYS | 100 | 41 | 10 | 0 | 5 | 16 | 3 | 2 | 2 | 3 | 0 |
| RELAXATION ON HOLIDAYS | 100 | 41 | 5 | 6 | 5 | 12 | 4 | 5 | 3 | 1 | 0 |

| SIXTIES-FEMALE | WATCH TV | NEWS | SPORTS | VARIETY | DRAMA | MOVIE | DOCUMENTARY | MUSIC | CULTURE | PROGRAM FOR CHILDREN |
|---|---|---|---|---|---|---|---|---|---|---|
| BREAKFAST | 100 | 57.5 | 54.3 | 0 | 0 | 2.1 | 0 | 0 | 1.1 | 0 | 0 |
| LUNCH | 100 | 63.8 | 36.2 | 0 | 7.4 | 12.8 | 0 | 2.1 | 0 | 5.3 | 0 |
| DINNER | 100 | 58.6 | 39.4 | 2.1 | 5.3 | 6.4 | 0 | 1.1 | 3.2 | 0 | 0 |
| RELAXATION ON WEEKDAYS | 100 | 39.4 | 11.7 | 2.1 | 4.3 | 17 | 2.1 | 1.1 | 1.1 | 0 | 1.1 |
| RELAXATION ON HOLIDAYS | 100 | 44.7 | 3.2 | 5.3 | 6.4 | 17 | 10.6 | 0 | 1.1 | 1.1 | 0 |

| CLUSTER 1 | WATCH TV | NEWS | SPORTS | VARIETY | DRAMA | MOVIE | DOCUMENTARY | MUSIC | CULTURE | PROGRAM FOR CHILDREN |
|---|---|---|---|---|---|---|---|---|---|---|
| BREAKFAST | 100 | 58.2 | 55.3 | 0.4 | 0 | 1.7 | 0 | 0 | 0 | 0.8 |
| LUNCH | 100 | 43.8 | 16.9 | 0 | 21.1 | 4.6 | 0 | 0.4 | 0 | 0.8 | 0 |
| DINNER | 100 | 65.8 | 36.3 | 0.8 | 16 | 5.5 | 1.3 | 0 | 0.4 | 0 | 5.5 |
| RELAXATION ON WEEKDAYS | 100 | 57.1 | 11.8 | 6.8 | 16.5 | 13.5 | 3 | 1.7 | 1.7 | 0.4 | 1.7 |
| RELAXATION ON HOLIDAYS | 100 | 42.7 | 2.1 | 11.4 | 13.5 | 7.2 | 3.8 | 1.3 | 1.3 | 0.4 | 1.7 |

| AVERAGE | GENRE |
|---|---|
| AGE | "WEEKLY AUDIENCE RATING DATA DIVIDED ACCORDING TO AGE AND SEX(%)" |

FIG. 13A

| AVERAGE | GENRE |
|---|---|
| AGE | "OFTEN-WATCHED PICTURE DIVIDED ACCORDING TO AGE AND SEX(%)" |

FIG. 13B

| | NEWS | SPORTS | VARIETY | DRAMA | MOVIE | DOCUMENTARY | MUSIC | CULTURE | PROGRAM FOR CHILDREN |
|---|---|---|---|---|---|---|---|---|---|
| AVERAGE FOR EACH AGE AND SEX | 100 | 96 | 74.2 | 75.3 | 65.2 | 84.7 | 53.4 | 59.3 | 62 | 38.6 |
| TEENS-MALE | 100 | 86.8 | 75.8 | 86.8 | 68.1 | 91.2 | 46.2 | 78 | 31.9 | 69.2 |
| TWENTIES-MALE | 100 | 94.4 | 75.6 | 85.6 | 66.7 | 88.9 | 52.2 | 71.1 | 45.6 | 45.6 |
| THIRTIES-MALE | 100 | 97.1 | 85.6 | 77.9 | 52.9 | 87.5 | 51.9 | 49 | 52.9 | 47.1 |
| FORTIES-MALE | 100 | 98.4 | 91.3 | 62.2 | 38.6 | 85 | 57.5 | 44.9 | 59.1 | 29.1 |
| FIFTIES-MALE | 100 | 98.8 | 85.7 | 50 | 39.3 | 78.6 | 48.8 | 39.3 | 60.7 | 9.5 |
| SIXTIES-MALE | 100 | 100 | 88.1 | 63.1 | 58.3 | 86.9 | 48.8 | 40.5 | 69 | 11.9 |
| TEENS-FEMALE | 100 | 92.6 | 73.4 | 94.7 | 93.6 | 95.7 | 57.4 | 85.1 | 58.5 | 69.1 |
| TWENTIES-FEMALE | 100 | 96.2 | 68.6 | 89.5 | 81.9 | 84.8 | 49.5 | 67.6 | 64.8 | 54.3 |
| THIRTIES-FEMALE | 100 | 96.1 | 56.3 | 82.5 | 74.8 | 81.6 | 58.3 | 70.9 | 69.9 | 71.8 |
| FORTIES-FEMALE | 100 | 98.1 | 59.8 | 75.7 | 68.2 | 83.2 | 55.1 | 55.1 | 69.2 | 26.2 |
| FIFTIES-FEMALE | 100 | 96 | 64 | 65 | 71 | 73 | 55 | 53 | 80 | 14 |
| SIXTIES-FEMALE | 100 | 96.8 | 66 | 69.1 | 73.4 | 80.9 | 57.4 | 59.6 | 79.8 | 10.6 |

| AVERAGE | GENRE |
|---|---|
| LIFE STAGE | "WEEKLY AUDIENCE RATING DATA DIVIDED ACCORDING TO LIFE STAGE(%)" |

FIG. 15A

| AVERAGE | GENRE |
|---|---|
| LIFE STAGE | "OFTEN-WATCHED PICTURE DIVIDED ACCORDING TO LIFE STAGE(%)" |

FIG. 15B

| AVERAGE | GENRE |
|---|---|
| FACTOR | "WEEKLY AUDIENCE RATING DATA DIVIDED ACCORDING TO FACTOR AXIS(%)" |

FIG. 16A

| AVERAGE | GENRE |
|---|---|
| FACTOR | "OFTEN-WATCHED PICTURE DIVIDED ACCORDING TO FACTOR AXIS(%)" |

FIG. 16B

| AVERAGE | GENRE |
|---|---|
| CLUSTER | "WEEKLY AUDIENCE RATING DATA DIVIDED ACCORDING TO ATTITUDE VALUE CLUSTER(%)" |

FIG. 16C

| AVERAGE | GENRE |
|---|---|
| CLUSTER | "OFTEN-WATCHED PICTURE DIVIDED ACCORDING TO ATTITUDE VALUE CLUSTER(%)" |

FIG. 16D

| | NEWS | SPORTS | VARIETY | DRAMA | MOVIE | DOCUMENTARY | MUSIC | CULTURE | PROGRAM FOR CHILDREN |
|---|---|---|---|---|---|---|---|---|---|
| CLUSTER AVERAGE | 100 | 96 | 74.2 | 75.3 | 65.2 | 84.7 | 53.4 | 59.3 | 62 | 38.6 |
| CLUSTER 1 | 100 | 97.9 | 82.7 | 84.8 | 69.2 | 86.1 | 54.4 | 61.6 | 53.2 | 41.4 |
| CLUSTER 2 | 100 | 98.6 | 84.1 | 71 | 34.8 | 76.8 | 59.4 | 42 | 53.6 | 33.3 |
| CLUSTER 3 | 100 | 97 | 76.2 | 71.3 | 62.4 | 90.1 | 63.4 | 44.6 | 67.3 | 39.6 |
| CLUSTER 4 | 100 | 98.3 | 62.7 | 74.6 | 70.3 | 89 | 55.9 | 61.9 | 74.6 | 33.9 |
| CLUSTER 5 | 100 | 95.2 | 82.2 | 95.2 | 90.4 | 97.3 | 61.6 | 87.7 | 65.1 | 61.6 |
| CLUSTER 6 | 100 | 98.3 | 62 | 50.4 | 43.8 | 72.7 | 45.5 | 47.9 | 58.7 | 22.3 |
| CLUSTER 7 | 100 | 96.2 | 65.2 | 78.8 | 68.9 | 84.1 | 46.2 | 66.7 | 63.6 | 36.4 |
| CLUSTER 8 | 100 | 92.2 | 82.4 | 80.4 | 52.9 | 64.7 | 31.4 | 62.7 | 45.1 | 43.1 |

SELECT EACH APPLICABLE ITEM WITH A CURSOR AND PUSH THE DETERMINATION BUTTON.

AGE: ○NINETEEN OR BELOW, ○TWENTIES, ●THIRTIES, ○FORTIES, ○FIFTIES, ○SIXTY AND OVER

SEX: ○MALE, ○FEMALE

○END

WHICH OF THE TYPES DO YOU CLOSE TO ? SELECT EACH APPLICABLE CIRCLE.

| | |
|---|---|
| YOU ARE AFFIRMATIVE TO TV. YOU PARTICIPATES A PROGRAM POSITIVELY AND REACTS. YOU WATCH INTERACTIVELY WITH EVERYONE. | IT IS A WASTE OF TIME TO WATCH TV. THERE ARE MANY WORTHLESS PROGRAMS. |
| TV IS USEFUL IN KNOWLEDGE EDUCATION. NEWS, DOCUMENTARY, AND SPORTS ARE GOOD. | YOU LIKE MERRY PROGRAMS. YOU WATCH TV UNRESTRICTEDLY AND WASTE YOUR TIME. |
| TV IS YOUR ESSENTIAL FUN AND AMUSEMENT. TV IS THE BEST FOR A CHANGE. | IT MIGHT BE BETTER NOT TO WATCH TV. YOU WATCH TV ONLY FOR A FREE TIME AND DO NOT CARE IF YOU HAVE NO TV. |
| YOU WATCH TV UNRESTRICTEDLY. YOU CAN NOT STOP ONCE YOU START. YOU WATCH TV TO BE PICKLED IN IT AND ZAP IT A LOT. | YOU WATCH ONLY A DESIRED PROGRAM. YOU WATCH TV ONLY FOR A VERY FREE TIME. |

(Each row has an UNDECIDED slider between the two options.)

WHICH OF THE TYPES DO YOU CLOSE TO ? SELECT EACH APPLICABLE CIRCLE.

| Left option | | Right option |
|---|---|---|
| YOU WANT TO WATCH A POPULAR PROGRAM. A SPECIAL PROGRAM IS INTERESTING. | UNDECIDED | TV IS NOT NECESSARY. THERE ARE MANY WORTHLESS PROGRAMS RECENTLY. |
| YOU HAVE NOT SO MANY PROGRAMS YOU ALWAYS WATCH. YOU PREFER A PROGRAM WITHOUT A STORY. | UNDECIDED | YOU HAVE PROGRAMS YOU ALWAYS WATCH. YOU PREFER A PROGRAM WITH A STORY. |
| YOU LIKE AN EASY PROGRAM WITHOUT A STORY. YOU LIKE TO WATCH A COMEDY LAUGHINGLY. YOU LIKE A LIGHT AND CHEERFUL PROGRAM. | UNDECIDED | YOU LIKE A LONG-TERM DRAMA AND STORY. YOU ARE IMPRESSED BY A DRAMA AND MOVIE AND SYMPATHIZE WITH THE CHARACTERS. YOU ARE DEEPLY IMPRESSED. |
| YOU WATCH TV MOSTLY ALONE. YOU TRY TO WATCH ONLY A DESIRED PROGRAM. | UNDECIDED | YOU WATCH TV MOSTLY WITH YOUR FAMILY. YOU WATCH TV HAPPILY. |

FIG. 21B

| WHICH OF THE TYPES DO YOU CLOSE TO ? SELECT ONE FROM THE TYPES 1 TO 8. | |
|---|---|
| 1. BALANCED GROUP | YOU ARE STANDARD AUDIENCE.<br>YOU ARE SLIGHTLY AFFIRMATIVE TO TV, WATCH UNRESTRICTEDLY, AND PREFER AN EASY PROGRAM WITHOUT STORY. |
| 2. UNRESTRICTEDLY ZAPPING GROUP | YOU WATCH TV UNRESTRICTEDLY AND ZAPS A LOT.<br>YOU PREFER AN EASY PROGRAM WITHOUT STORY.<br>YOU ARE NEGATIVE TO TV COMPARATIVELY. |
| 3. UNRESTRICTED GROUP | YOU WATCH TV UNRESTRICTEDLY AND CAN NOT STOP ONCE YOU START.<br>YOU DO NOT PARTICIPATE IN TV POSITIVELY.<br>YOU PREFER A PROGRAM WITH A STORY AND DRAMA COMPARATIVELY. |
| 4. ABSORBED IN STORY PROGRAM GROUP | YOU PREFER AN IMPRESSION WITH A STORY AND DRAMA.<br>YOU DO NOT PARTICIPATE IN TV POSITIVELY.<br>YOU WATCH TV RESTRICTEDLY COMPARATIVELY. |
| 5. TV IS MY FRIEND GROUP | YOU PARTICIPATE IN TV POSITIVELY AND ENJOY WITH EVERYONE.<br>YOU PREFER AN IMPRESSIVE PROGRAM WITH A STORY AND DRAMA.<br>YOU HAVE A TENDENCY TO WATCH TV UNRESTRICTEDLY. |
| 6. ANTI-TV GROUP | YOU ARE NEGATIVE TO TV.<br>YOU SELECT A DESIRED PROGRAM.<br>YOU WATCH AN EASY PROGRAM WITHOUT A STORY COMPARATIVELY. |
| 7. BUSY GROUP | YOU SELECT A SPECIALLY DESIRED PROGRAM.<br>YOU ARE AFFIRMATIVE TO TV COMPARATIVELY AND PARTICIPATE IN TV.<br>YOU WATCH REGARDLESS OF A PROGRAM TYPE. |
| 8. LAUGHTER GROUP | YOU PREFER AN EASY AND COMFORTABLE PROGRAM WITHOUT STORY.<br>YOU ARE AFFIRMATIVE TO TV AND PARTICIPATE POSITIVELY.<br>YOU SELECT A COMPARATIVELY DESIRED PROGRAM. |

FIG. 22

| GENRE | AVERAGE | BREAKFAST | LUNCH | DINNER | RELAXATION ON WEEKDAYS | RELAXATION ON HOLIDAYS |
|---|---|---|---|---|---|---|
| | | | | | | |

"AUDIENCE RATING OF GENRE DIVIDED ACCORDING TO LIFE SCENE."

NOTE: M IS AN IDENTIFICATION KEY INDICATING SEX OF MALE.

| THIRTIES-MALE (30.1.M) | | | | | |
|---|---|---|---|---|---|
| TWENTIES-MALE (20.1.M) | | | | | |
| GENRE | AVERAGE | BREAKFAST | LUNCH | DINNER | RELAXATION ON WEEKDAYS | RELAXATION ON HOLIDAYS |

"AUDIENCE RATING OF GENRE FOR EACH LIFE SCENE DIVIDED ACCORDING TO AGE AND SEX."

| CLUSTER ⑤ | RECOMMENDATORY PROGRAMS/TITLE LIST | NOVEMBER 22 (FRI.) 10:00PM |

| | |
|---|---|
| 🎟 | THE ×××<br>YOU WIN A PRIZE OF FOREIGN WORLD TRAVELING AT LAST ? |
| ☆ | △△ SHOW<br>YOU CAN NOT MISS THIS WEEK'S ○○ ! |
| ▷E | ○○○<br>THE GRANDSTORY OF THE FIRST LOCATION OF ×× IN A DRAMA!! |
| ### | "×××" '93 ○○ DIRECTOR<br>THE SCHOOL PICTURE FOR YOUNG FROM ○○ DIRECTOR. |
| ⬡T | JAPANESE MUSIC TOP 10 "△△△"<br>××× WILL CONTINUE TO BE ON THE TOP THIS WEEK ? |
| U⌐ | VOL.4 ○○<br>THAT △△ RUNS THROUGH THE KARAOKE FIELD LIKE A STORM !? |

4A

INFORMATION RETRIEVAL METHOD AND APPARATUS

BACKGROUND OF THE INVENTION

1. Field of the Invention

This invention relates to an information retrieval method and apparatus, and more particularly, is applicable to a program retrieval method and apparatus for retrieving a program desired to be watched by an audience among from a large number of television programs which are transmitted via a broadcasting satellite.

2. Description of the Related Art

In a satellite broadcasting system that television programs are transmitted to an audience via a broadcasting satellite, television signal is digitalized and a huge amount of programs are transmitted at the same time. Such a system increases the number of programs from which an audience should select.

Moreover, in a system for providing various information from a host computer to computer terminals through the telephone line or the exclusive line, a user at a terminal side selects a necessary information among from a huge amount of information, and requests it from the host computer side.

When an audience or a user tries to select a television program or the information on a computer, there is a problem that the retrieval operation of audience or user becomes complicated since a desired program or information must be retrieved among from a huge amount of programs or information, so that it is difficult to select a necessary program or information easily.

SUMMARY OF THE INVENTION

In view of the foregoing, an object of this invention is to provide an information retrieval method and apparatus which is capable of easily retrieving a necessary information for audience or users.

The foregoing object and other objects of the invention have been achieved by the provision of an information retrieval method and apparatus. In the information retrieval method and apparatus, a specific user's own initial user model is formed based on the general user selection taste data consisting of classification items and contents of information on the basis of the user group classified by a user attribute and/or the state of information utilization, and based on the basic information selection taste data of a specific user; and information for the specific user is retrieved based on the initial user model and the state of information utilization.

According to this invention, the general user selection taste data is corrected by the basic selection taste data of a specific user, so that the recommendatory program suiting the specific user is retrieved.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 4A to 4C are schematic diagrams showing the data tables centered in the audience ratings of genres divided according to life scene;

FIGS. 5A and 5B to 10A and 10B are schematic diagrams showing the concrete examples of the audience ratings of genres divided according to life scene;

FIG. 12 is a schematic diagram showing the audience ratings of genres for each life scene divided according to the first cluster;

FIGS. 13A and 13B are schematic diagrams showing the user models based on "audience rating data" and "often-watched picture data";

FIG. 14 is a schematic diagram showing the concrete example of the often-watched picture data divided according to age;

FIGS. 15A and 15B are schematic diagrams showing the user models based on "audience rating data" and "often-watched picture data";

FIGS. 16A to 16D are schematic diagrams showing the user models based on "audience rating data" and "often-watched picture data";

FIG. 17 is a schematic diagram showing the concrete example of the often-watched picture data which is divided according to cluster;

FIGS. 21A and 21B are schematic diagrams showing interactive pictures at the time of inputting a profile relating to an attitude value factor;

FIG. 22 is a schematic diagram showing an interactive picture at the time of inputting a profile relating to an attitude value cluster;

FIG. 24 is a schematic diagram showing knowledge base data with identification in linear interpolation;

FIG. 27 is a schematic diagram showing the display example of programs to be selected;

FIG. 30 is a schematic diagram showing the other display example of programs to be selected.

DETAILED DESCRIPTION OF THE EMBODIMENT

Preferred embodiments of this invention will be described with reference to the accompanying drawings:

(1) The Whole Construction of a Satellite Broadcasting Receiving System

Figure 1:
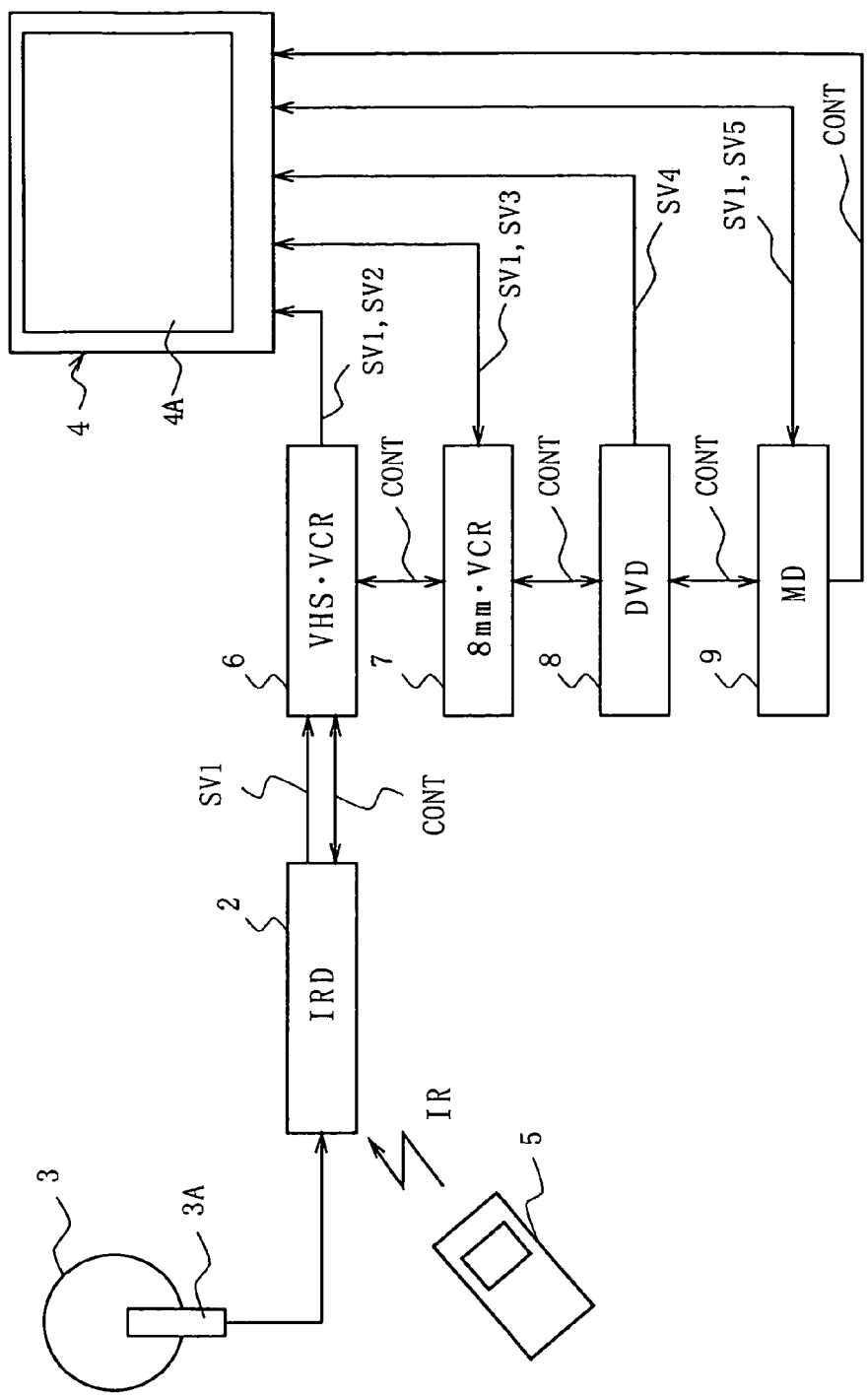
FIG. 1 is a block diagram showing a satellite broadcasting receiving system using an information retrieval apparatus according to this invention.

In FIG. 1, 1 generally shows a satellite broadcasting receiving system. Broadcasting signal received by a parabolic antenna 3 is demodulated and compressive-decoded at an integrated receiver/decoder (IRD) 2. The obtained video/audio signal SV1 is outputted to a VHS-system video cassette recorder (VCR) 6.

The VCR 6 records the video/audio signal SV1 on a video tape which has been loaded therein, or outputs the video/audio signal SV1 through the output line to a monitor device 4 as it is to display this on the monitor device 4.

While, when an audience operates a remote commander 5, a command in accordance with the operation is converted into infrared-ray signal IR, and is outputted to the integrated receiver/decoder 2. The integrated receiver/decoder 2, in accordance with the command, performs various operations such as channel change, user data registration/reading, and output of control signal CONT to devices (VCR 6, VCR 7, DVD 8, and MD 9) connected to the integrated receiver/decoder 2. The control signal CONT is outputted to the VCR 6 through the control line. If the VCR 6 is specified as a target to be controlled by the control signal CONT, the VCR 6 is controlled by the control signal CONT. On the contrary, if one of the devices successively connected to the VCR 6 through the control line (a 8 mm-system VCR 7, a digital video disc (DVD) player 8, a mini disc (MD) player, and the monitor device 4) is specified as a target to be controlled by the control signal CONT, the VCR 6 outputs the control signal CONT to the 8 mm-system VCR 7 as it is.

When the control signal CONT is inputted, the VCR 7 discriminates the device specified by the control signal CONT. If the discriminated result is the VCR 7, the VCR 7 executes the operation specified by the control signal CONT. In the case where the command is to reproduce the 8 mm video tape loaded in the VCR 7 for example, the VCR 7 reproduces the video tape and outputs the reproduction video signal SV3 to the monitor device 4 to display this. Also, in the case where the command of the control signal CONT is to record the broadcasting signal (video/audio signal SV1) received and decoded by the integrated receiver/decoder 2 on the VCR 7, the VCR 7 records the video/audio signal SV1 inputted from the integrated receiver/decoder 2 via the VHS-system VCR 6 and the monitor device 4. On the contrary, when a target to be controlled by the control signal CONT is not the VCR 7, the VCR 7 outputs the control signal CONT to the DVD 8 as it is.

When the control signal CONT is inputted, the DVD 8 discriminates the device specified by the control signal CONT. If the discriminated result is the DVD 8, the DVD 8 executes the operation specified by the control signal CONT. In the case where the command is to reproduce a video and/or audio from a disc loaded in the DVD 8 for example, the DVD 8 reproduces the disc and outputs the video/audio signal SV4 to the monitor device 4 to display this. On the contrary, when a target to be controlled by the control signal CONT is not the DVD 8, the DVD 8 outputs the control signal CONT to the MD 9 as it is.

When the control signal CONT is inputted, the MD 9 discriminates the device specified by the control signal CONT. If the discriminated result is the MD 9, the MD 9 executes the operation specified by the control signal CONT. In the case where the command is to reproduce a disc loaded in the MD 9 for example, the MD 9 reproduces the disc and outputs the audio signal SV5 to the monitor device 4 to display that the disc can be listened. Also, in the case where the command of the control signal CONT is to record the broadcasting signal (video/audio signal SV1) received and decoded by the integrated receiver/decoder 2 on the MD 9, the MD 9 records audio signal of the video/audio signal SV1 inputted from the integrated receiver/decoder 2 via the VHS-system VCR 6 and the monitor device 4. On the contrary, when a target to be controlled by the control signal CONT is not the MD 9, the MD 9 outputs the control signal CONT to the monitor device 4 as it is. At this time, the monitor device 4 executes the operation specified by the control signal CONT.

(2) The Construction of the Integrated Receiver/Decoder

Figure 2:
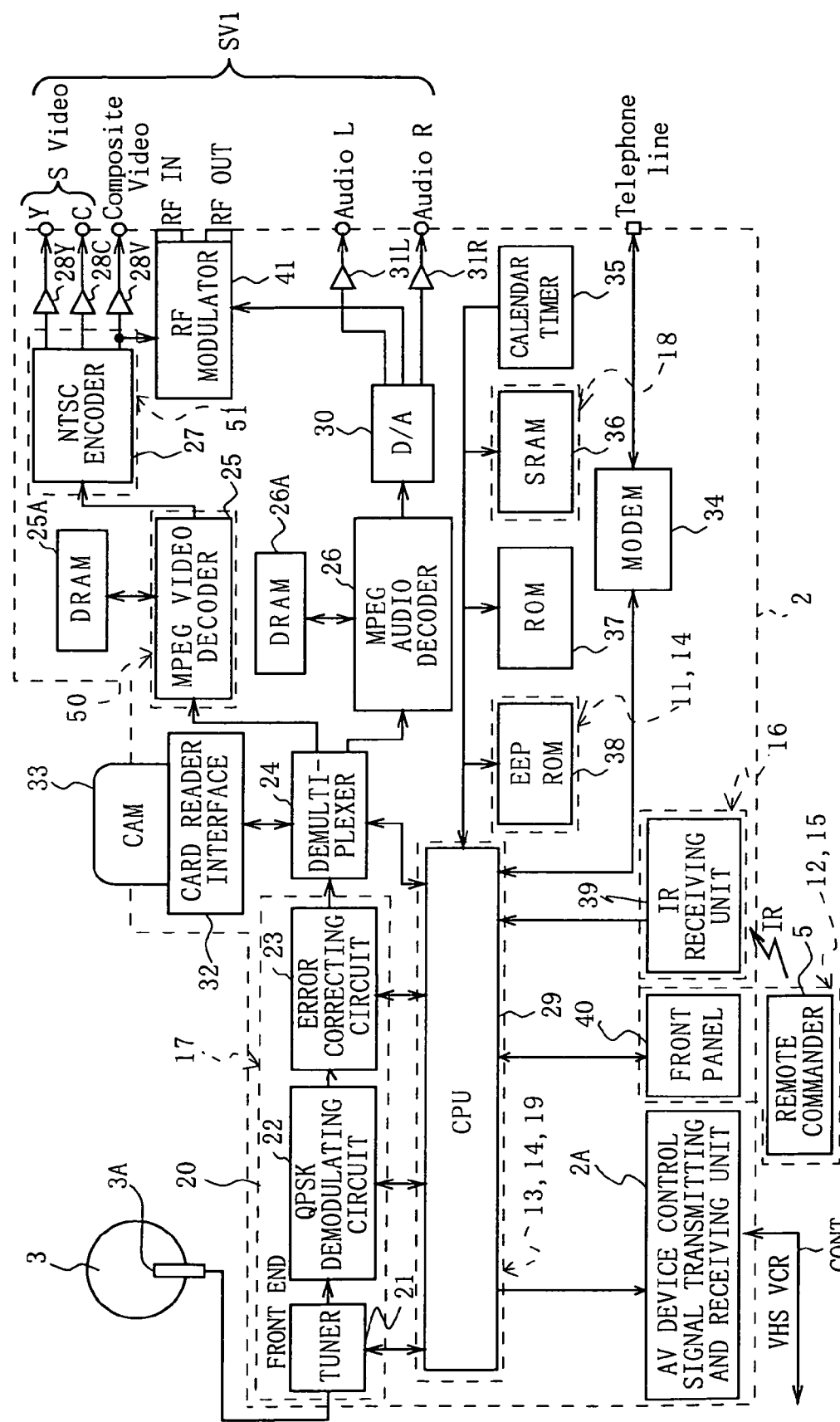
FIG. 2 is a block diagram showing the construction of an integrated receiver/decoder including the information retrieval apparatus.

In FIG. 2, in the integrated receiver/decoder 2, RF signal outputted from a low noise block downconverter (LNB) 3A of the parabolic antenna 3 is supplied to a tuner 21 of a front end 20 to be demodulated. The output of the tuner 21 is supplied to a QPSK demodulating circuit 22 to be QPSK-demodulated. The output of the QPSK demodulating circuit 22 is supplied to an error correcting circuit 23 where errors are detected, corrected, and revised if necessary.

In a conditional access module (CAM) 33 composed of a CPU and IC cards being a ROM and a RAM, the keys necessary to decipher codes are stored together with a deciphering program. Since the signal transmitted via the broadcasting satellite is coded, the keys and deciphering processing are needed to decipher the codes. Therefore, the keys are read from the CAM 33 via a card reader interface 32, and supplied to a demultiplexer 24. The demultiplexer 24 uses the keys to decipher the coded signal.

The demultiplexer 24 receives the signal outputted from the error correcting circuit 23 of the front end 20, supplies the deciphered video signal to a MPEG video decoder 25, and supplies the deciphered audio signal to a MPEG audio decoder 26.

The MPEG video decoder 25 stores the inputted digital video signal in a DRAM 25A, and decodes the video signal which has been compressed by MPEG method. The decoded video signal is supplied to a NTSC encoder 27, and converted into luminance signal (Y), chroma signal (C), and composite signal (V) of NTSC method. The luminance signal and the chroma signal are outputted as S video signal via a buffer amplifiers 28Y and 28C. The composite signal is outputted via a buffer amplifier 28V.

The MPEG audio decoder 26 stores the digital audio signal supplied from the demultiplexer 24 in a DRAM 26A, and decodes the audio signal which has been compressed by MPEG method. The decoded audio signal is digital-to-analog converted in a D/A converter 30. Left-channel audio signal is outputted via a buffer amplifier 31L, and right-channel audio signal is outputted via a buffer amplifier 31R.

A RF modulator 41 converts the composite signal outputted from the NTSC encoder 27 and the audio signal outputted from the D/A converter 30 into RF signal, and outputs them. Also, the RF signal of NTSC method inputted from other devices passes through the RF modulator 41, and it is outputted to other devices as it is.

In this embodiment, these video signal and audio signal are supplied to the VCR 6 through the AV line.

The CPU 29 executes various processing in accordance with the program which has been stored in the ROM 37. Further, the CPU 29 controls an AV device control signal transmitting and receiving unit 2A, outputs a predetermined control signal to other devices through the control line, and receives control signal from other devices.

The operation button switch of a front panel 40 is operated to input a predetermined command directly to the CPU 29. When the operation keys of the remote commander 5 are operated, infrared ray signal is outputted by an IR sending unit of the remote commander 5, the infrared ray signal is received by an IR receiving unit 39, and the received result is supplied to the CPU 29. Accordingly, the remote commander 5 is operated to input a predetermined command to the CPU 29.

The CPU 29 takes in, e.g., electronic program guide (EPG) information excepting for the video signal and audio signal outputted from the demultiplexer 24, to generate EPG data from this, and supplies it to a static random access memory (SRAM) 36 to be stored. The EPG information includes the information relating to programs of broadcasting channels from current time to several ten hours later (e.g., channel of program, broadcasting period, title, genre, explanation of program, etc.). Since the EPG information is transmitted frequently, the latest EPG information is constantly maintained in the SRAM 36.

In an electrically erasable programmable read only memory (EEPROM) 38, data which is desired to be maintained after shutting off the power supply (e.g., rewritable receipt history for past four weeks or data of a knowledge base unit 11 described later) is stored. The CPU 29 compares time information outputted from a calendar timer 35 with time stamp separated from the received signal by the demultiplexer 24 and outputted, and controls the MPEG video decoder 25 and the MPEG audio decoder 26 so as to decode at a correct timing in accordance with the compared result.

Further, the CPU 29 controls the MPEG video decoder 25 to generate a predetermined on-screen display (OSD) data. The MPEG video decoder 25 generates the predetermined OSD data in accordance with this control, which is written in the DRAM 25A and read to be outputted. Thereby, predetermined characters and figures can be outputted to the monitor device 4 and displayed.

Figure 3:
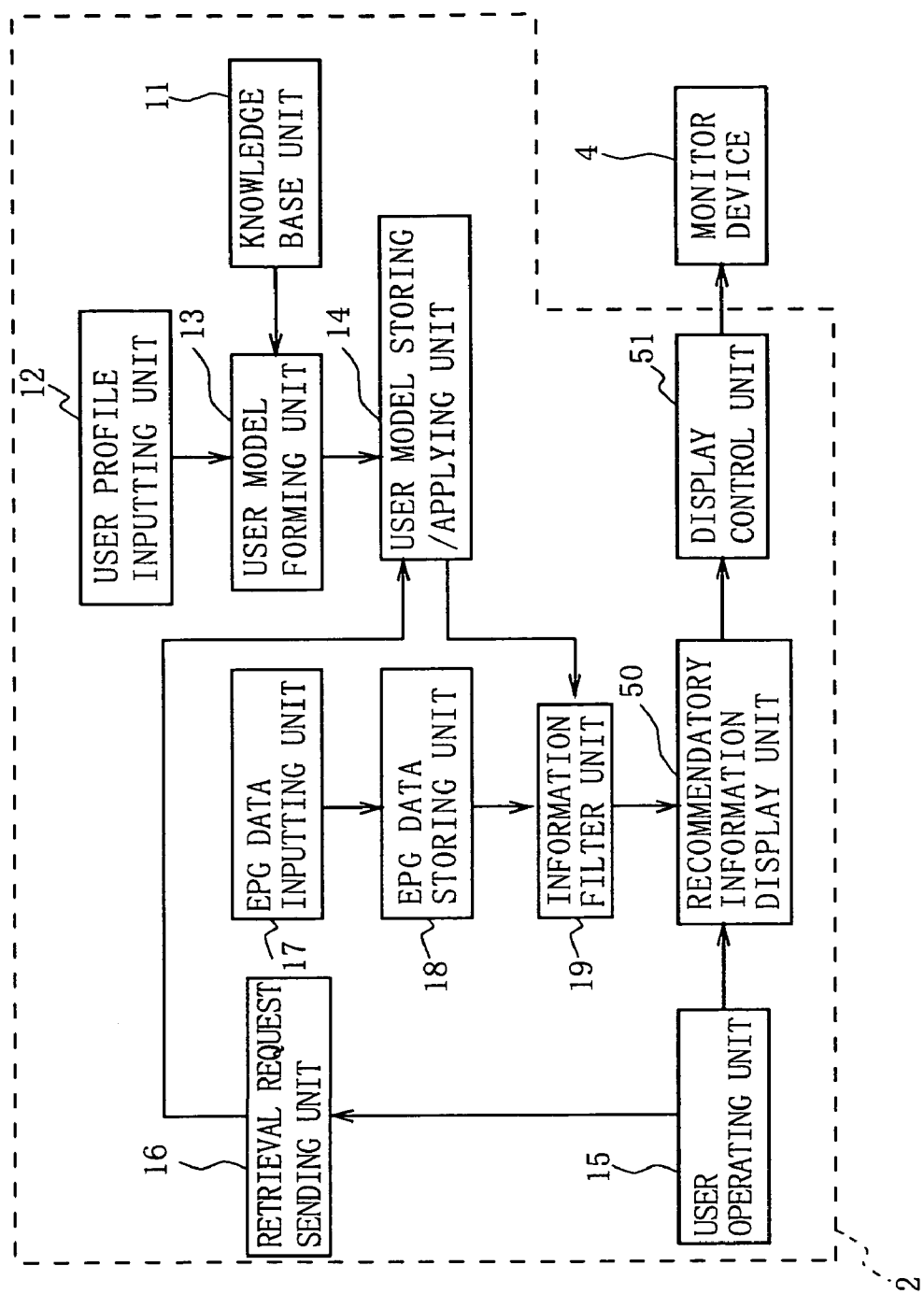
FIG. 3 is a block diagram showing an information retrieval function block of the integrated receiver/decoder.

FIG. 3 shows a block diagram of the information retrieval function unit for retrieving a program desired by a user based on the EPG information in the integrated receiver/decoder 2 of FIG. 2. More specifically, as shown in FIG. 3, the EEPROM 38 (FIG. 2) of the integrated receiver/decoder 2 is assigned as the knowledge base unit 11, a user model storing/applying unit 14, and the EPG data storing unit 18 (however, the CPU 29 (FIG. 2) is assigned to the applying unit of the user model storing/applying unit 14.). The CPU 29 (FIG. 2) is assigned as the user model forming unit 13 and the information filter unit 19. The front end 20 (FIG. 2) is assigned as the EPG data inputting unit 17. The remote commander 5 and the front panel 40 (FIG. 2) are assigned as the user profile inputting unit 12 and the user operating unit 15. The IR receiving unit 39 and the CPU 29 (FIG. 2) are assigned as the retrieval request sending unit 16. The MPEG video decoder 25 (FIG. 2) is assigned as a recommendatory information display unit 50. The NTSC encoder 27 (FIG. 2) is assigned as the display control unit 51. In connection, the data of the knowledge base unit 11 is stored in the EEPROM 38 when the integrated receiver/decoder 2 is shipped, and new data is taken in from the exterior via a satellite or a modem 34, so that data can be updated. If the data of the knowledge base unit 11 is not to be updated, the data previously stored as data of the knowledge base unit 11 may be stored in the ROM 37. The EPG data taken in via the front end 20 (FIG. 2) or the modem 34 (in the case of Internet) is stored in the SRAM 36.

When the operation key of program guide is selected by the user operation unit 15 of FIG. 3, the CPU 29 of FIG. 2 controls the MPEG video decoder 25 (the recommendatory information display unit 50) to display a broadcasting program selection picture on the monitor device 4. A user transfers a cursor to the position of a desired program, and clicks the remote commander 5 to select and specify the desired program.

Further, the CPU 29 can update the data stored in the EEPROM 38 (i.e., the knowledge base unit 11 of FIG. 3) with the latest data taken in from the exterior via the modem 34. In connection, as a method of taking in the data of the EEPROM 38 from an exterior device (a floppy disc, a card recording medium, etc.), the output line for only data may be provided in addition to the communication using a modem.

The CPU 29 stores the data which has been stored in the EEPROM 38 (i.e., the knowledge base unit 11) in an exterior recording device via a modem or the output line provided exclusively (not shown), and it is taken in if necessary, so that the data of the knowledge base unit 11 before updating can be used again.

(3) Information Retrieval by the Integrated Receiver/Decoder (3-1) The Construction of General User Model FIG. 3 shows a function block of the part relating to the information retrieval of the integrated receiver/decoder 2 described above in FIG. 2. The knowledge base unit 11 previously stores "watching action of user" obtained based on the result of audience research, as "general user model".

The "general user model" is the audience rating, showing for each genre, of programs watched by a user who is classified according to the various characteristics among from users being audience; and the audience rating of genre for each life scene, often-watched picture (genre), and watching time for a week, showing the state of information utilization of each user.

As the first method of classifying users, there is a classification according to age and sex. In this classification, users are divided into twelve items, in which six stages of teens to fifties and people sixty and over are further divided into male and female. The audience ratings of genre for each life scene of each user classified according to age and sex is kept as a data table TB1. As shown in FIG. 4A, the data is an audience rating table of each program genre for each life scene such as "breakfast time", "lunch time", "dinner time", "relaxation time on weekdays", and "relaxation time on a holiday". For example, a table is created from the audience ratings of a plurality of program genres at "breakfast time", which is divided according to age and sex.

FIGS. 5 to 10 show the concrete examples of the data table that these tabled data are collected for a plurality of life scenes. FIG. 5A shows the audience ratings of program genres for each life scene of teens-male, FIG. 5B shows the audience ratings of program genres for each life scene of twenties-male, FIG. 6A shows the audience ratings of program genres for each life scene of thirties-male, FIG. 6B shows the audience ratings of program genre for each life scene of forties-male, FIG. 7A shows the audience ratings of program genres for each life scene of fifties-male, and FIG. 7B shows the audience ratings of program genres for each life scene of sixties-male.

Also, FIG. 8A shows the audience ratings of program genres for each life scene of teens-female, FIG. 8B shows the audience ratings of program genres for each life scene of twenties-female, FIG. 9A shows the audience ratings of program genres for each life scene of thirties-female, FIG.

9B shows the audience ratings of program genres for each life scene of forties-female, FIG. 10A shows the audience ratings of program genres for each life scene of fifties-female, and FIG. 10B shows the audience ratings of program genres for each life scene of sixties-female.

Figure 11:
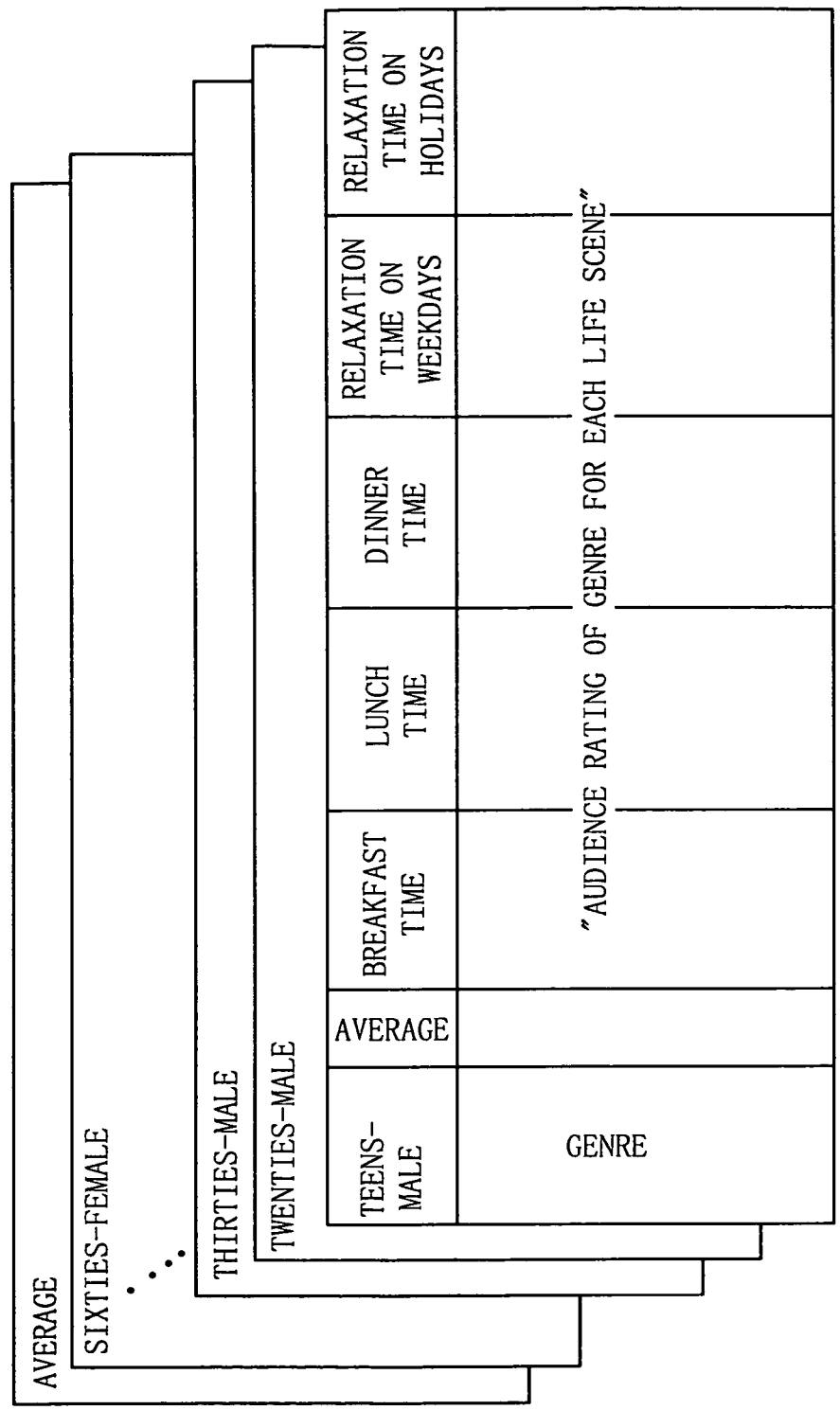
FIG. 11 is a schematic diagram showing the construction of audience rating data divided according to age and sex, life scene, and genre.

In this way, as shown in FIG. 11, data tables consisting of the audience ratings of program genre for each life scene divided according to age and sex, and an average data table which is obtained by calculating the average of the audience rating of each program genre between respective data tables are stored in the knowledge base unit 11 (FIG. 3), so that a habit of which the genre of program to be watched is determined depending on each life scene as a user's characteristics of selecting a program can be obtained previously as a general user data for each age and sex. Therefore, an audience inclination appearing for each age and sex of a general user can be obtained from the data table TB1.

Further, as the second method of classifying users, as shown in FIG. 4B, there is a classification according to life stage. In this classification, users are divided into stages such as "schooling", "work", "marriage", "nursing", and "retirement" as a personally growth stage of a user having a relation with user's family and society. The audience ratings of genres for each life scene of each user classified according to life stage is kept as a data table TB2. The data is an audience rating table of each program genre for each life scene such as "breakfast time", "lunch time", "dinner time", "relaxation time on weekdays", and "relaxation time on a holiday". For example, a table is created from the audience ratings of a plurality of program genres at "breakfast time", which is divided according to life stage. At this time, in a stage until a married female becomes more than sixty and retired, the stage is further divided into a female having job and a house wife.

In this way, data tables consisting of the audience ratings of program genre for each life scene divided according to life stage, and an average data table which is obtained by calculating the average of the audience rating of each program genre between respective data tables are stored in the knowledge base unit 11 (FIG. 3), so that a habit of which the genre of program to be watched is determined depending on each life scene as a user's characteristics of selecting a program can be obtained previously as a general user data for each life stage. Therefore, an audience inclination appearing for each life stage of a general user can be obtained from the data table TB2.

Further, as the third method of classifying users, as shown in FIG. 4C, there is a classification according to attitude value characteristics relating to television watching. In this classification according to attitude value characteristics, users are divided into eight factors based on the analyzed result of the opinion for watching television (television watching attitude value) from data obtained from a statistically significant number of market researches covering audience. These factors are determined by a positive participation axis representing whether a user participates positively or not; a knowledge education axis representing whether a user demands a knowledge education or not; an affirmative/negative axis representing whether a user affirms television or not; an unrestriction/restriction axis representing whether a user watches television restrictedly or not; a trend inclination axis representing whether a user regards a trend as most important thing or not; a whim/standard axis representing whether a user watches television on a whim or not; an easiness/absorption axis representing whether a user watches television easily or not; and an loneliness/happy circle axis representing whether a user watches television alone or not. In each of thus classified factors, the high scored group which is upper sixteen percents of the users is defined as "+" upper group of each factor and the low scored group which is lower sixteen percents of the users is defined as "−" lower group of each factor. The audience rating of genre for each life scene of each group is kept as a data table TB3. The data is an audience rating table of each program genre for each life scene such as "breakfast time", "lunch time", "dinner time", "relaxation time on weekdays", and "relaxation time on a holiday". For example, a table is created from the audience ratings of a plurality of program genres at "breakfast time", for each factor.

In this way, data tables consisting of the audience ratings of program genre for each life scene divided according to factor, and an average data table which is obtained by calculating the average of the audience rating of each program genre between respective data tables are stored in the knowledge base unit 11 (FIG. 3), so that a habit of which the genre of program to be watched is determined depending on each life scene as a user's characteristics of selecting a program can be obtained previously as a general user data for each factor (that is, television watching attitude value). Therefore, an audience inclination appearing for each value of a general user can be obtained from the data table TB3.

As a method of classification of attitude value characteristics on television watching, there is a classification according to cluster in addition to a classification according to factor as shown in FIG. 4C. In this classification according to cluster, for example, the television watching attitude and three factors of action (a positive participation axis, an unrestriction/restriction axis, an easiness/absorption axis) are picked up among from eight factors described above in FIG. 4C to analyze them, so as to obtain eight user clusters.

More specifically, the eight user clusters are: "balanced" group who are standard audience and slightly television affirmative audience, watch unrestrictedly, and prefer an easy program without story, as the first cluster; "unrestrictedly zapping" group who watch television unrestrictedly, prefer an easy program without story, and are negative to television, as the second cluster; "unrestricted" group who watch television most unrestrictedly, do not participate positively, and prefer a program with story and drama, as the third cluster; "absorbed in story program" group who prefer an impression with story and drama, do not participate positively, and watch television restrictedly, as the fourth cluster; "television is my friend" group who participate positively to enjoy themselves, prefer an impressive program with story and drama, and have a tendency to watch television unrestrictedly, as the fifth cluster; "anti-television" group who are negative to television, select only a desired program, and watch an easy program without story, as the sixth cluster; "busy" group who like television but can not watch because he/she is busy, select only an especially desired program, are comparatively affirmative and participating audience, and watch regardless of an impressive program with drama or an easy program, as the seventh cluster; and laughter group who prefer an easy and comfortable program without story, are affirmative audience and participate positively, and select comparatively only a desired program, as the eight cluster.

In this way, data tables consisting of the audience ratings of program genre for each life scene divided according to cluster, and an average data table which is obtained by calculating the average of the audience rating of each program genre between respective data tables are stored in the knowledge base unit 11 (FIG. 3), so that a habit of which the genre of program to be watched is determined depending on each life scene as a user's characteristics of selecting a program can be obtained previously as a general user data for each cluster (that is, television watching attitude value). Therefore, an audience inclination appearing for each value of a general user can be obtained from the data table. In connection, FIG. 12 shows the concrete example of the audience ratings of genre divided for each life scene of the first cluster.

As a general user data stored in the knowledge base unit 11 (FIG. 3), there is information utilizing state data of user. The first information utilizing state data is, as shown in FIG. 13A, a table created from weekly audience rating data corresponding to each program genre for each age and sex, and as shown in FIG. 13B, a table created from often-watched program genre for each age and sex by audience rating. FIG. 14 shows the concrete example of table of FIG. 13B.

The second information utilizing state data is, as shown in FIG. 15A, a table created from weekly audience rating data corresponding to each program genre for each life stage, and as shown in FIG. 15B, a table created from often-watched program genre for each life stage by audience rating.

The third information utilizing state data is, as shown in FIG. 16A, a table created from weekly audience rating data corresponding to each program genre for each factor axis, and as shown in FIG. 16B, a table created from often-watched program genre for each factor axis by audience rating.

The fourth information utilizing state data is, as shown in FIG. 16C, a table created from weekly audience rating data corresponding to each program genre for each attitude value cluster, and as shown in FIG. 16D, a table created from often-watched program genre for each attitude value cluster by audience rating. FIG. 17 shows the concrete example of the eight clusters described above and the often-watched program genre corresponding to each cluster.

(3-2) Formation of Initial User Model

In FIG. 3, a user operates the user profile inputting unit 12 to form an initial user model suiting a specific user. More specifically, a user operates the remote commander 5 (FIG. 2) of the user profile unit 15, so as to input a user profile interactively on a picture displayed on the monitor device 4.

Figure 18:
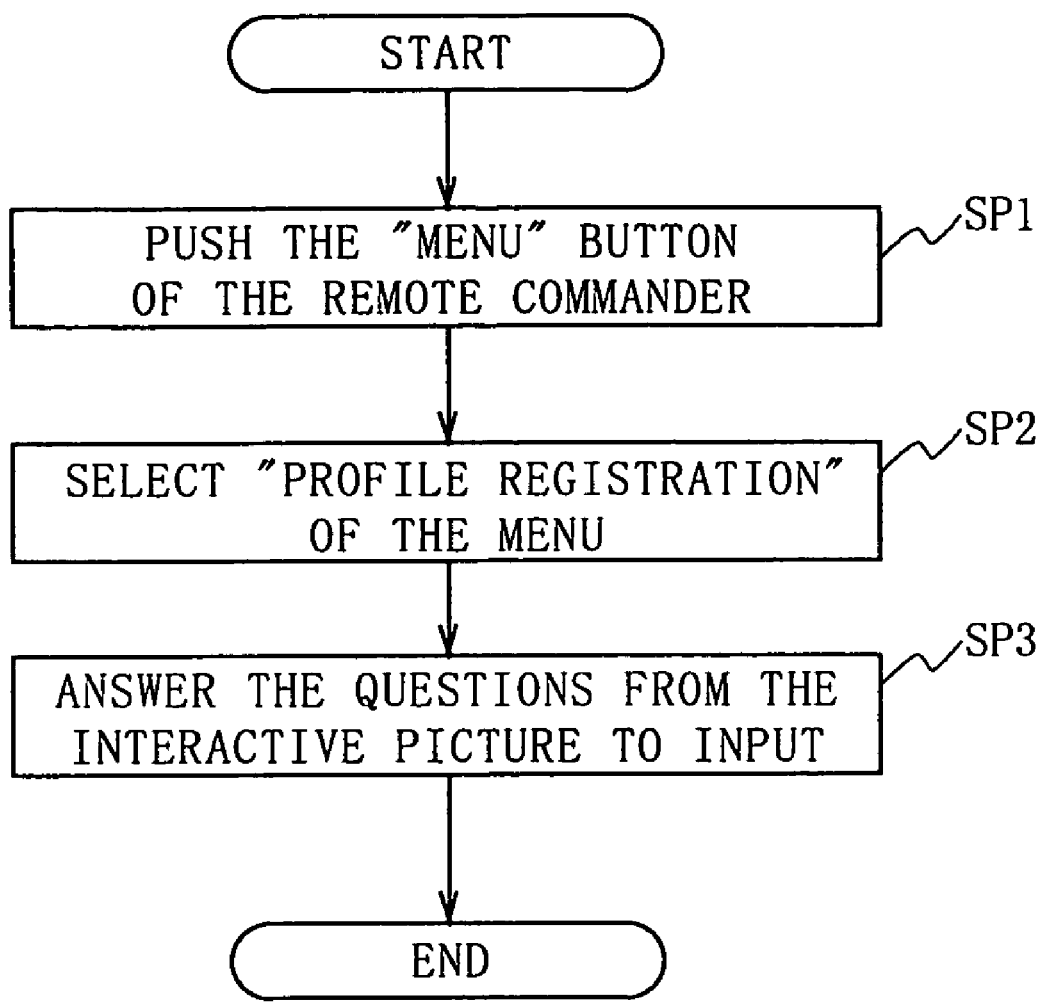
FIG. 18 is a flow chart showing a profile registering procedure.

The inputting procedure is shown in FIG. 18. A user first operates "menu" button of the remote commander 5 at step SP1 of the procedure, so that the CPU 29 (FIG. 2) of the integrated receiver/decoder 2 displays a menu picture on the display picture 4A of the monitor device 4. At next step SP2, the user operates the cursor transfer keys of the remote commander 5, so as to transfer a cursor on the picture to a position where a profile registration is specified, and selects this through the determination key.

Figure 19:
FIGS. 19 and 20 are schematic diagrams showing interactive pictures.

Therefore, an interactive picture is displayed on the monitor picture, and the user, at step SP3, inputs the user profile with an answer and question system on the interactive picture. FIG. 19 shows a question picture corresponding to the data table TB1 (FIG. 4A) of general user classified and set for each age and sex in the knowledge base unit 11. The user operates the remote commander 5 to transfer a cursor on the picture, and clicks the determination key so as to input the age and sex specified by a cursor.

Figure 20:
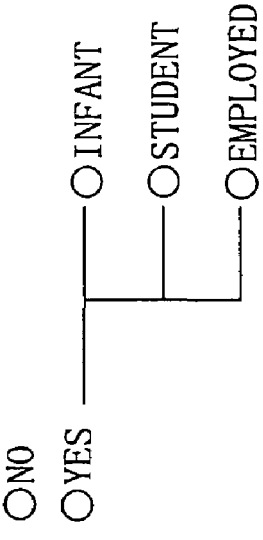

When the input of age and sex is completed, an interactive picture shown in FIG. 20 is displayed on the monitor device 4. FIG. 20 shows a question picture corresponding to the data table TB2 (FIG. 4B) of general user classified and set for each life stage in the knowledge base unit 11. The user operates the remote commander 5 to transfer a cursor on the picture, and clicks the setting key so as to input the life stage item specified by a cursor.

When the input of life stage is completed, interactive pictures shown in FIGS. 21A and 21B are displayed on the monitor device 4. FIGS. 21A and 21B show question pictures corresponding to the data table TB3 (FIG. 4C) of general user classified and set for each factor of attitude value relating to television audience in the knowledge base unit 11. The user operates the remote commander 5 to transfer a cursor on the picture, and clicks the setting key so as to input the factor item specified by a cursor.

When the input of factor item is completed, an interactive picture shown in FIG. 22 is displayed on the monitor device 4. FIG. 22 shows a question picture corresponding to the data table (FIG. 12) of general user classified and set for each cluster of attitude value relating to television audience in the knowledge base unit 11. The user operates the remote commander 5 to transfer a cursor on the picture, and clicks the setting key so as to input the cluster specified by a cursor.

The profile data of a specific user inputted from the user profile inputting unit 12 in FIG. 3 in this way is outputted to the user model forming unit 13 (FIG. 3). The user model forming unit 13 checks the user profile data inputted from the user profile inputting unit 12 against each data table of the knowledge base unit 11, and specifies a user group among from the data tables conforming to the user profile data, which is set to a user model. For example, when the user model of thirties-male is specified at the time of inputting a profile of age and sex, the thirties-male table is formed as a user model $U_{1A}$ of the specific user from each data table consisting the audience rating data divided according to age and sex, life scene, and genre described above in FIG. 11.

Similarly, a user model $U_{1B}$ divided according to life stage, a user model divided according to factor, and a user model divided according to cluster are formed in accordance with respective profile input.

The user model forming unit 13 obtains a table $U_1$ of "the audience rating of genre divided according to life scene viewed from demographic" represented by the following equation:

$$U_1 = \frac{U_{1A} + U_{1B}}{2} \quad (1)$$

from the user model $U_{1A}$ divided according to age and sex, and the user model $U_{1B}$ divided according to life stage.

Further, the user model forming unit 13 obtains the table $U_2$ of audience rating of genre divided according to life scene viewed from a factor axis relating to the specific user, from the profile input data (FIG. 23) relating to a factor of the specific user who operates at this time, for each factor of the audience rating of genre divided according to life scene (FIG. 4C) viewed from a factor axis of the general user model which have been previously stored in the knowledge base unit 11. More specifically, a factor value $F_{(n)}$ of the specific user at this time is obtained for each factor of eight items from the profile input data divided according to a factor item described above in FIGS. 21A and 21B, and a table is created for each life scene from the average value of the audience rating for each program genre corresponding to factor values $F_{(n)}$ of eight factors, so that the audience rating table $U_2$ of genre divided according to life scene viewed from a factor axis relating to the specific user is obtained.

Therefore, the user model forming unit 13 obtains the "the audience rating of genre divided according to life scene" data U of the specific user, by the following equation:

$$U = \frac{U_1 + U_2}{2} \qquad (2)$$

from "the audience rating of genre divided according to life scene viewed from demographic" table $U_1$ and "the audience rating of genre divided according to life scene viewed from a factor axis" table $U_2$. As a result, "the audience rating of genre divided according to life scene" table relating to the specific user as shown in FIG. 23 is obtained.

Figure 23:
FIG. 23 is a schematic diagram showing a data table of a specific user.

The specific user data in FIG. 23 is the case of thirties-male, but the case where the specific user is 28 year-old male is described here. The knowledge base unit 11 has attribute data of a format that an interpolation control identification key "1" is added to each data divided according to age "10, 1, 20, 1, 30, 1, 40, 1, 50, 1, 60, 1) as an attribute of the user group divided according to age. Therefore, when the data "28 year-old male" is input to the user profile input unit 12, the user model forming unit 13 detects the interpolation control identification key "1", age and sex from the data received from the user profile input unit 12, confirms this with the interpolation control identification key "1" of the data of twenties-male and thirties-male shown in FIG. 24 extracted from the knowledge base unit 11 to check, and forms the user model data of the personal user by applying the calculation equation corresponding to each interpolation control identification key, that is the linear interpolation here.

Thus, the continuous age data which is compressed for each ten-years can be stored in the knowledge base unit 11. In connection, as an attribute of the user classification using the interpolation control efficiently, there are user's hobby, years of experience of sports, and continued years of membership in addition to age attribute described above in FIG. 24.

Figure 25A:
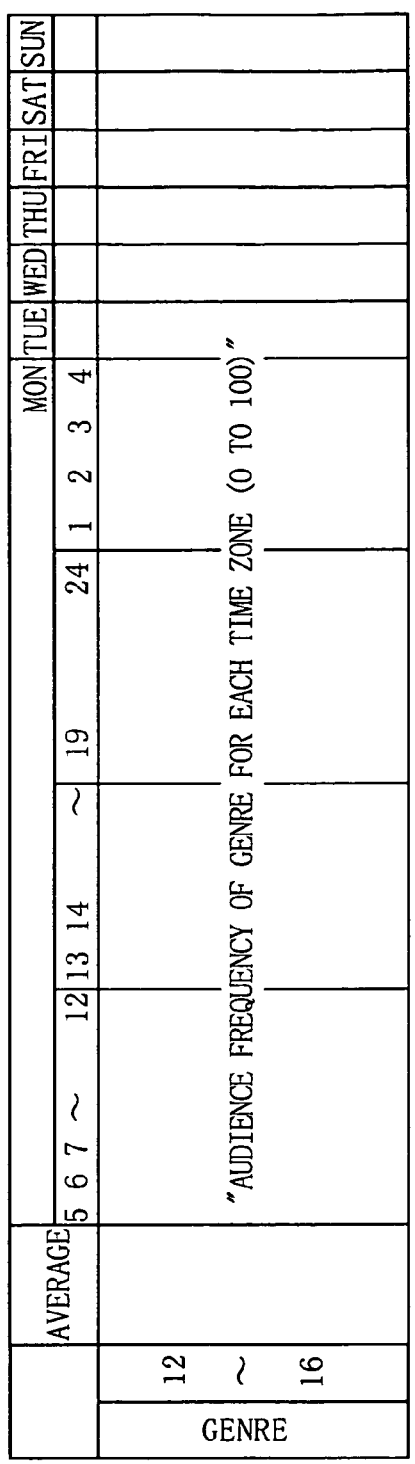
FIGS. 25A and 25B are schematic diagrams explaining data conversion by a corresponding function.
Figure 25B:
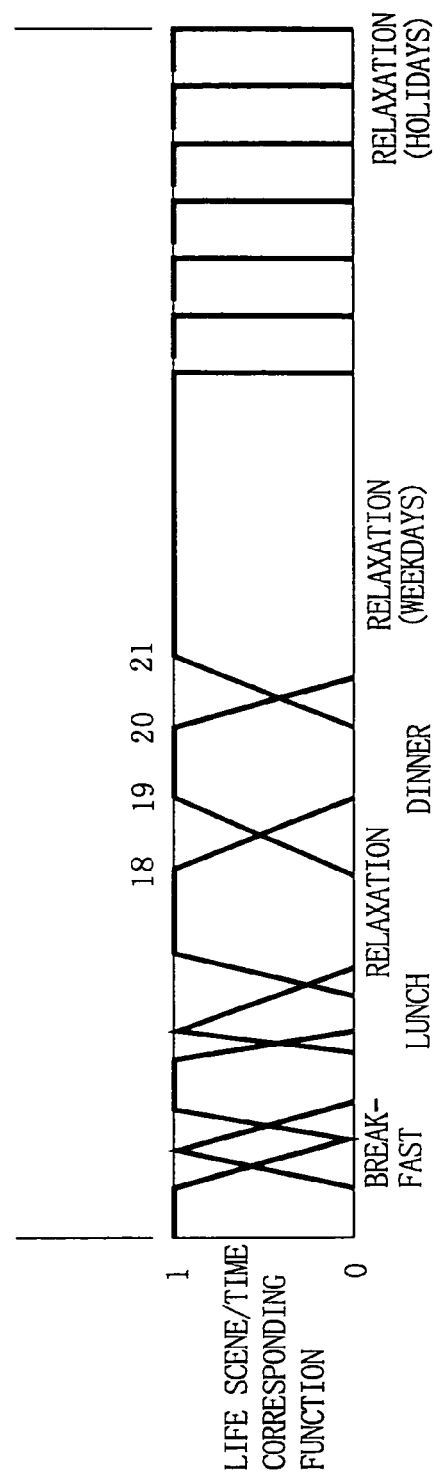

Thus obtained data of "audience rating of genre divided according to life scene" relating to the specific user is obtained on the basis of the life scene of general user model. In this case, the user model forming unit 13 has the life scene/time corresponding function shown in FIGS. 25A and 25B, and this function is outputted to the user model storing/applying unit 14, so that the genre taste value (audience rating) corresponding to the life scene at the time of "n" when the user requests the program guide actually is calculated at the user model storing/applying unit 14.

For example, the audience rating data at dinner is multiplied by a coefficient "1" between 19:00 to 20:00 and a coefficient "0" at 21:00. Each data is multiplied by a coefficient according to the linear interpolation between 20:00 to 21:00. Data at a relaxing time after dinner is multiplied by a coefficient "1" after 21:00, and the data at a relaxing time is multiplied by a coefficient "0" at 20:00.

As a concrete example, if a program guide is requested at 20:40, the user model storing/applying unit 14 calculates the genre taste value $F_{20}$ at 20:40, setting the genre taste value at dinner to $F_y$ and the genre taste value at a relaxing time on weekdays to $F_k$, by the following equation:

$$F_{20} = \frac{F_y \cdot (60-40)}{60} + \frac{F_k \cdot 40}{60} \qquad (3)$$

In connection, the genre taste value obtained by the corresponding function is calculated by the corresponding function (parameter is a constant value) which is determined as a life scene of the general user model. In this embodiment, the user model forming unit 13 converts "audience rating of genre divided according to life scene" of the specific user obtained based on the user profile input into the data table fitting for the life habit of the specific user based on the meal time data of the specific user.

Figure 26:
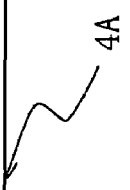
FIG. 26 is a schematic diagram showing an interactive picture.

More specifically, the knowledge base unit 11 has a variable term which changes in accordance with the life habit of the specific user on the corresponding function. The user model forming unit 13 demands a user to input a variable data to be substituted for the variable term. The user model forming unit 13 displays an interactive picture shown in FIG. 26 on the monitor device 4 as an input demand. In accordance with this picture, the user inputs usual dinner starting time "a", usual dinner finishing time "b", earlier dinner starting time "c", and later dinner finishing time "d" as variable data by using the remote commander. Then, the user model forming unit 13 calculates the genre taste value (audience rating) at a time "n" (o'clock) when a program guide is requested, based on the input data.

More specifically, if the time "n" when a program guide is requested is between "a" and "b", the genre taste value $F_{yn}$ relating to the life scene at dinner at the time "n" is calculated, setting the genre taste value of general user at dinner to $F_y$, by the following equation:

$$F_{yn} = F_y$$

(where, $a \leq n \leq b$) \qquad (4)

Further, if the time "n" when a program guide is requested is between "c" and "a", the genre taste value $F_{yn}$ relating to the life scene at dinner at the time "n" is calculated by the following equation:

$$F_{yn} = F_y \cdot \frac{n-c}{a-c} \qquad (5)$$

(where, $c \leq n < a$)

Further, if the time "n" when a program guide is requested is between "b" and "d", the genre taste value $F_{yn}$ relating to the life scene at dinner at the time "n" is calculated by the following equation:

$$F_{yn} = F_y \cdot \frac{d-n}{d-b} \qquad (6)$$

(where, $b < n \leq d$)

Further, if there are the life scenes having the number of "m", and the genre taste value relating to all of life scene at the time "n" when a program guide is requested is set to $F_n$, it is represented by the following equation:

$$F_n = \Sigma F_{mn} \qquad (7)$$

However, if $F_n>1$, $F_n=1$, and when setting the average value of the genre taste to $F_a$, if the genre taste value $F_n$ is less than a fixed ratio of the average value $F_a$ (e.g., a half of $F_a$), $F_n=0.5F_a$.

Thus obtained data is calculated whenever a program guide is requested from a user, and is outputted to the information filter unit 19 (FIG. 3).

In this way, the time which is a continuous amount is compressed by the life scene data, and corrected to data suiting the specific user's habit. In connection, other attribute data such as time spent in commuting which influences the utility of media, frequency of request for information, and passed period after a movie, music, or publication relating to news value is started to be sold can be used in addition to life scene, as an information utilizing state.

(3-3) The Application of the Specific User Model

When a user operates, when watching television, a program guide key on the remote commander 5 (FIG. 2) of the user operation unit 15, the program guide demand command is outputted from the remote commander 5 to the retrieval request sending unit 16. The retrieval request sending unit 16 outputs day of the week and time data read from the internal clock and filter data output requesting signal to the user model storing/applying unit 14, in accordance with the program guide demand.

The user model storing/applying unit 14 calculates the genre taste value $F_n$ corresponding to the day of the week and time data in demanding the program guide from the data table of the specific user model, and forms the genre priority order table, which is outputted to the information filter unit 19.

The information filter unit 19 rearranges the electronic program guide (EPG) data corresponding to the time a program guide is demanded, in accordance with the genre priority table, among from the EPG data which has been received at an EPG data information inputting unit 17 with the satellite broadcasting wave and stored in the EPG data storing unit 18, and outputs this data to a recommendatory information display unit 50.

Figure 27:
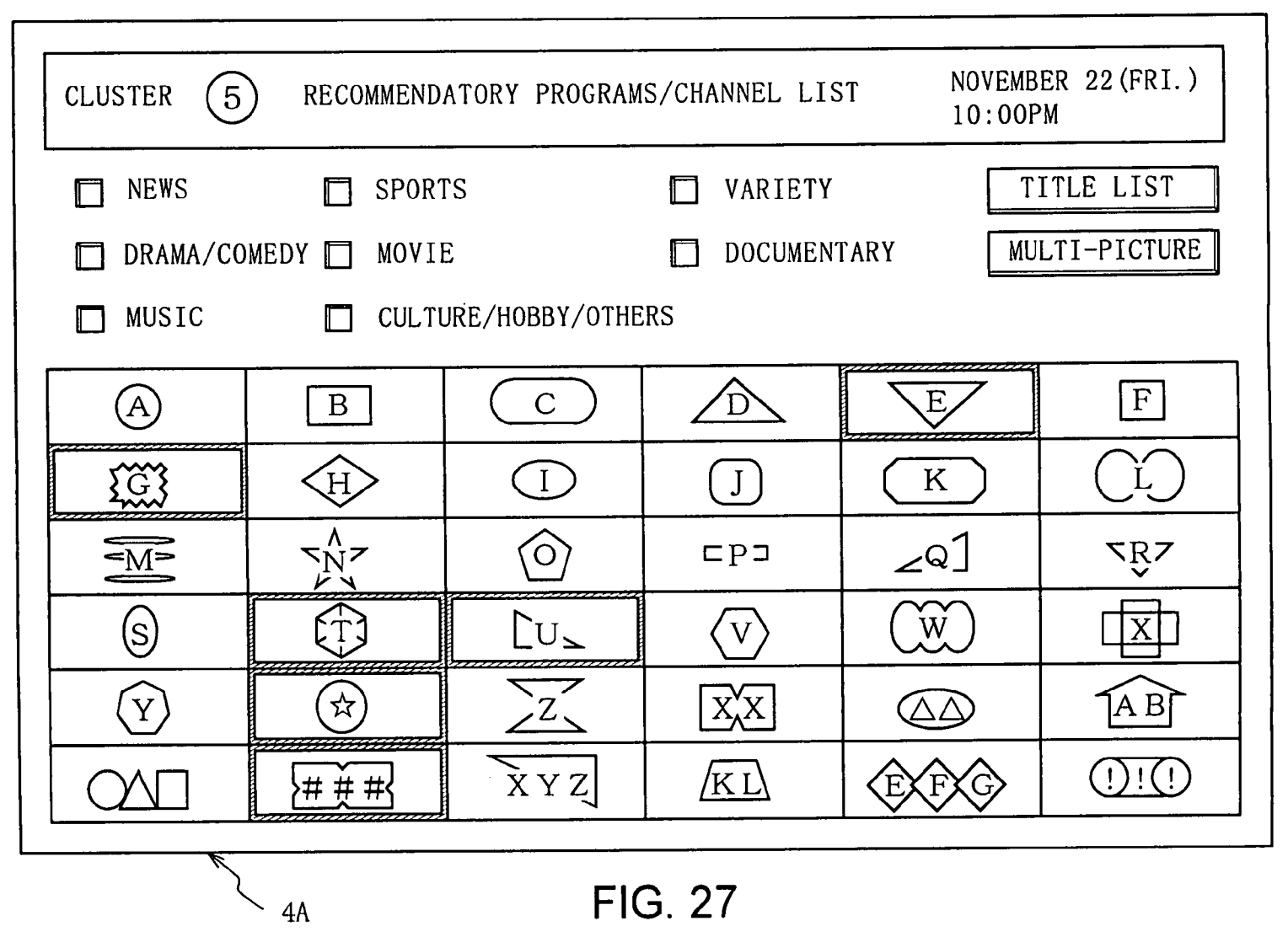

The recommendatory information display unit 50 displays the EPG data rearranged in accordance with the genre priority table on the monitor device 4 in the form of the predetermined display form. As a result, as shown in FIG. 27, the list of the programs being on the air is displayed when the program guide is demanded, by combining characters and/or figures representing the broadcasting station, etc. In this list, only programs prioritized by the information filter unit 19 are encircled by a bold frame. The bold frame has colors which are different from each other in genre. The user refers the color, and specifies and selects a desired program by a cursor among from the programs encircled by a bold frame.

In this way, the initial user model is formed by the profile data inputted from the profile inputting unit 12, and a program desired by a user is selected based on the data. In connection, when the user specifies a predetermined time in the future for example, and demands a program guide, the retrieval request sending unit 16 outputs the time and date data to the user model storing/applying unit 14, so as to calculate the program selection information of the specified time and date.

(3-4) The Formation and Application of Study User Model

The integrated receiver/decoder 2 updates the initial user model which has been stored in the user model storing/applying unit 14 (FIG. 3) to form a study user model.

Figure 28A:
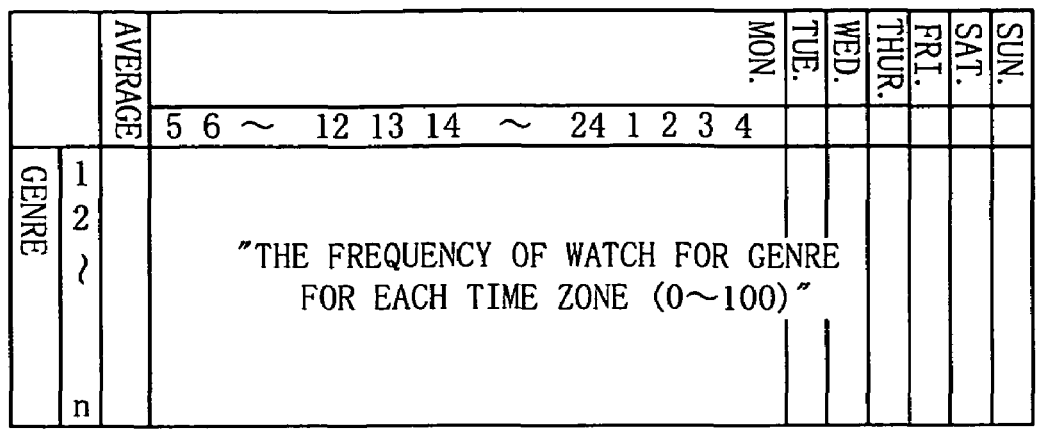
FIGS. 28A and 28B are schematic diagrams showing audience history data.
Figure 28B:
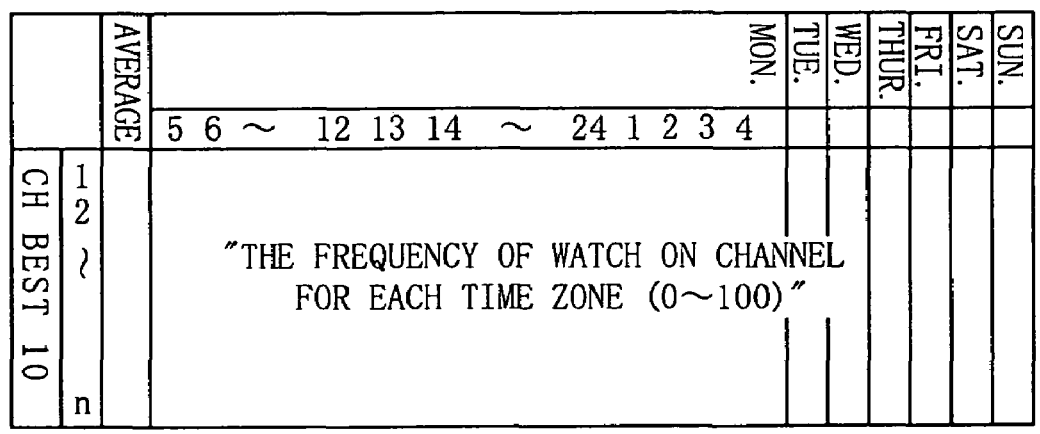

More specifically, the user model storing/applying unit 14, which has a frequency data table of watch for genre for each time zone shown in FIG. 28A and a frequency data table of watch on channel for each time zone shown in FIG. 28B, adds one point to the frequency data for genre and the frequency data on channel corresponding to the time zone each other when a user continuously watches a program for more than five minutes, and adds two points to the frequency data for genre and the frequency data on channel corresponding to the time zone each other when a user continuously watches a program for more than fifty minutes. Further, when a user continuously watches a program for more than five minutes, the EPG data of the program is added to a record file of the EPG data storing unit 18.

The user model storing/applying unit 14 updates the initial user model of a specific user based on the frequency data of watch for genre for each time zone and the frequency data of watch on channel for each time zone thus obtained. The initial user model consists of the initial data table representing the audience rating of genre for each life scene and the corresponding function of the specific user's own for converting the audience rating of genre for each life scene into the data corresponding to time and day of the week. Therefore, the user model storing/applying unit 14 updates the initial user model based on the audience rating data of genre for each time zone which is updated by the audience history, to form the study user model. As a method of updating the initial user model, there are other method of adding the number of points of the frequency data for genre for each time zone to each audience rating data (taste value) of the initial user model, or method of weighting each audience rating data (taste value) of the initial user model in accordance with the number of points.

In this way, when a user requests a program guide, the genre priority table is created by the study user model in the user model storing/applying unit 14 to be outputted to the information filter unit 19. Thereby, the recommendatory program determined by the study user model is displayed on the monitor device 4, and the user can watch the program guide on the basis of his/her audience history.

In connection, a user can operate the remote commander to specify that the frequency data on channel for each time zone shown in FIG. 28B is displayed on the monitor as the audience history for each channel.

(4) The Operation and Effects of the Embodiments

Figure 29:
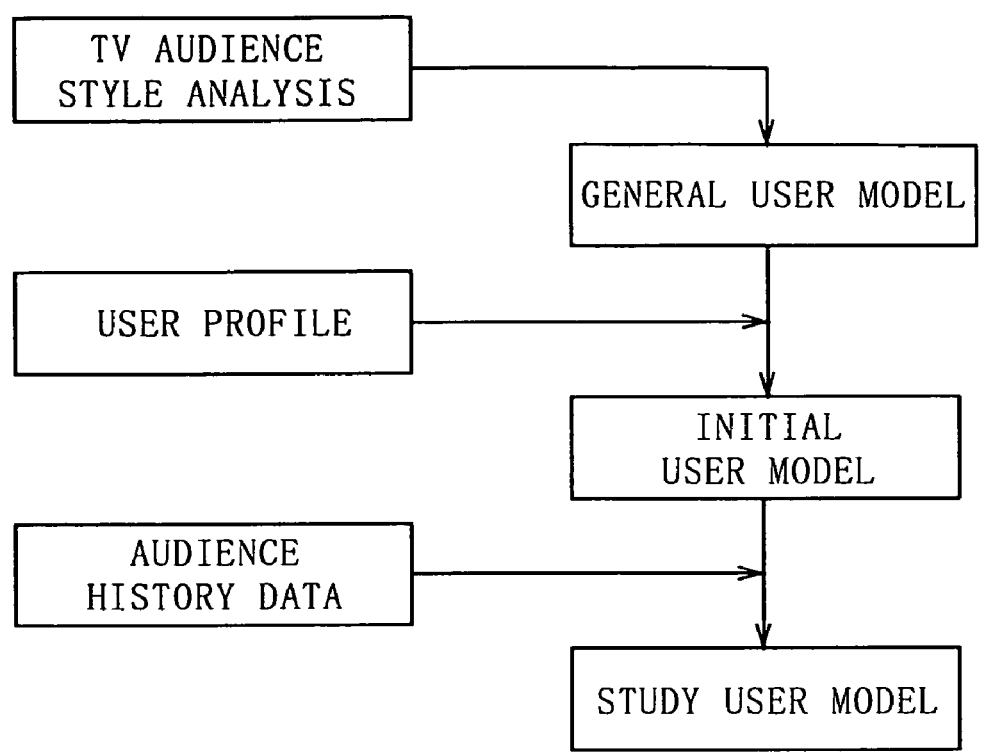
FIG. 29 is a schematic diagram showing the construction procedure of user models.

In the above-described construction, as shown in FIG. 29, the general user model previously stored in the knowledge base unit 11 is obtained from the result that the television watching style of general users is analyzed, and is not always meet to a specific user as it is. Therefore, the specific user corrects the general user model based on the profile data of the specific user inputted from the user profile input unit 12, so as to form the specific user' own user model.

The data inputted as a specific user profile are age and sex of the specific user above-described in FIG. 19, life stage of the specific user above-described in FIG. 20, "attitude value of television audience" factor above-described in FIGS. 21A and 21B, and "attitude value of television audience" cluster above-described in FIG. 22. These profile data are the basic data of the specific user which will not be changed for a long period, such as basic taste and value of the specific user for television broadcasting or programs, and method and attitude of watching television.

Therefore, the initial-user model formed by the profile data is a specific user's own basic model which will not be changed for a long period. The initial user models thus formed are modified by the actual audience history data to form the study user model that the specific user's selection inclination in accordance with the change of feeling is reflected on the specific user's own basic model.

The priority order of programs is determined by the study user model formed on the basic model, so that the audience history can be reflected as the specific user's current program selecting inclination without the influence from the past audience history having the accidental nature.

Thus, with the above constitution, the program priority order is determined based on the specific user's own basic selection taste, so that the user can easily obtain a program list having the current taste inclination on the basis of the own basic selection taste among from a huge amount of the programs.

(5) Other embodiments

The embodiment described above has been dealt with the case where the genres such as "news", "sports", "variety", "drama", "movie", "documentary", "music", "culture", and "program for children" are set as a program classification. However, this invention is not limited to this, but other classification can be set such as classifications according to other various genres, further detailed genres, or according to performer.

The embodiment described above has been dealt with the case where the initial user model is formed based on the classification according to age and sex, life stage, attitude value factor, and attitude value cluster. However, this invention is not limited to this, but only one or two of these classifications can be selected to form the initial user model.

The embodiment described above has been dealt with the case where the dispersed data for every ten year are stored in the knowledge base unit 11 as age data and are linearly interpolated. However, instead of the linear interpolation, various interpolation calculation such as the trapezoid interpolation can be applied.

The embodiment described above has been dealt with the case where as shown in FIG. 27, a plurality of program lists and the selected program list are displayed at the same time as display examples of the program list to be displayed on the monitor device 4. However, this invention is not only limited to this, but as shown in FIG. 30, only the selected program list can be displayed together with the explanation of the contents.

The embodiment described above has been dealt with the case where this invention is applied to an apparatus for retrieving digital broadcasting programs. However, this invention is not limited to this, but can be applied to various information retrieving apparatuses such as the retrieval of a huge amount of data by Internet, and the retrieval of package information of a mini disc (MD) and a digital video disc (DVD). In the case of applying the digital video disc device 8 and the mini disc device 9, in FIG. 1, the digital video disc (DVD) 8 and the mini disc (MD) 9 hold plural discs respectively, have a disc changer for selecting a disc in response to the specification from a user, store package information of each held disc (disc title and genre, etc.) in the SRAM 36 (FIG. 2) of the integrated receiver/decoder (IRD) via the control line, and selects a disc which suits the specific user among from the discs based on the user's own basic selection taste, similarly to the case described above in FIG. 3, to display a guide on the monitor picture. Therefore, the user selects a disc suiting himself from a list displayed on the monitor picture, and the control signal is outputted from the IRD 2 to the digital video disc device 8 or the mini disc 9 in accordance with this, and the fit disc is selected. In connection, the package information (disc title and genre) of each disc may be previously stored in each disc, and is read out by the disc changer, or the user may input the package information when each disc is loaded into the disc changer.

Also, in addition to the method of selecting a disc suiting the user among from a plurality of discs, all of the programs or music titles recorded in each disc have been previously stored in the SRAM 36 together with the genre, and the program or music title suiting the specific user can be retrieved. As a result, the disc in which the program or the music title selected by the user is recorded is selected.

Further, in the case of retrieving the Internet information, the Internet information (title relating to each home page or the genre) inputted through the communication line is stored in the SRAM 36, and the information based on the user's basic selection taste can be retrieved.

The embodiment described above has been dealt with the case where the information retrieving device is provided in the satellite broadcasting receiver/decoder (IRD) 2. However, this invention is not limited to this, but in a system for controlling the IRD 2, VCRs 6, 7, DVD 8, and MD 9 from a software installed in a personal computer and the computer respectively, a system can be constructed such as to select a program or music title based on the user's basic selection taste by the personal computer. In this case, instead of the personal computer, an exclusive device (at least, which includes a information retrieving block shown in FIG. 3) can be provided.

According to the present invention, based on the user's own basic selection tastes, the priority order of the information is determined, so as to realize an information retrieval method and the apparatus which can retrieve the information desired by the group easily among from a huge amount of programs.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An information retrieval method, comprising the steps of:
forming a general user model based on statistical data obtained by audience research on the actions of a plurality of users; said general user model having general user selection taste data; said statistical data including an audience rating for each of a plurality of genres, a plurality of life-scenes, and wherein each user is classified according to various characteristics including at least an age, a sex, and a life-stage;
inputting a user profile for a specific user;
forming an initial user model for said specific user based on said general user selection data and said user profile;
forming a study user model on the basis of said initial user model and an information selection history for said specific user;
retrieving information suiting said specific user based on said study user model by calculating a genre taste value based on a request time for an electronic program guide (EPG); said genre taste value being calculated using a life-scene/time function representing a relationship between the life-scene corresponding to the request time and a time-variable coefficient, said time-variable coefficient being determined by a linear interpolation on the basis of the request time and defining a value for said life-scene/time function; and rearranging and displaying the EPG based on a genre priority table formed using the retrieved information and the calculated genre taste value;

wherein said general user selection taste data is dispersed data, including time related data, that is interpolated into continuous data by an interpolation method specified by an interpolation control identification key.

2. The information retrieval method according to claim 1, wherein said interpolation method is a method of interpolating in accordance with a user attribute and/or a state of information utilization.

3. An information retrieval apparatus, comprising:

general user model forming means for forming a general user model based on statistical data obtained by audience research on the actions of a plurality of users; said general user model having general user selection taste data; said statistical data including an audience rating for each of a plurality of genres, a plurality of life-scenes, and wherein each user is classified according to various characteristics including at least an age, a sex, and life-scene;

input means for inputting a user profile for a specific user;

initial user model forming means for forming an initial user model for said specific user based on said general user selection data and said user profile;

study user model forming means for forming a study user model on the basis of said initial user model and an information selection history for said specific user;

retrieving means for retrieving information suiting said specific user based on said study user model by calculating a genre taste value based on a request time for an electronic program guide (EPG); said genre taste value being calculated using a life-scene/time function representing a relationship between the life-scene corresponding to the request time and a time-variable coefficient, said time-variable coefficient being determined by a linear interpolation on the basis of the request time and defining a value for said life-scene/time function; and display means for rearranging and displaying the EPG based on a genre priority table formed using the retrieved information and the calculated genre taste value;

wherein said general user selection taste data is dispersed data, including time related data, that is interpolated into continuous data by an interpolation method specified by an interpolation control identification key.

4. The information retrieval apparatus according to claim 3, further comprising storing means for storing said general user selection taste data as the continuous data is converted into dispersed data.

5. The information retrieval apparatus according to claim 4, wherein said storing means stores the identification key for specifying said interpolation method, together with said dispersed data.

6. The information retrieval apparatus according to claim 4, further comprising rewriting means for rewriting the general user selection taste data of said storing means onto another storing means.

* * * * *